(12) United States Patent
Folchetti et al.

(10) Patent No.: US 7,536,025 B2
(45) Date of Patent: May 19, 2009

(54) PROCESS, SYSTEM, OR METHOD FOR THE DETERMINATION OF THE PERCENTAGE OF AREA OF A PARCEL OF LAND AVAILABLE FOR DEVELOPMENT OR PRESERVATION AND THE PRODUCTION OF A REPORT AND MAP THEREFOR ON A FIXED TANGIBLE MEDIUM

(76) Inventors: John E. Folchetti, 690 Route 311, Patterson, NY (US) 12563; J. Robert Folchetti, 1056 Drewville Rd., Brewster, NY (US) 10509

( * ) Notice: Subject to any disclaimer, the term of this patent is extended or adjusted under 35 U.S.C. 154(b) by 673 days.

(21) Appl. No.: 11/159,493

(22) Filed: Jun. 23, 2005

(65) Prior Publication Data
US 2006/0294062 A1    Dec. 28, 2006

(51) Int. Cl.
G06K 9/00 (2006.01)
G06K 9/54 (2006.01)
G06F 17/30 (2006.01)

(52) U.S. Cl. ............................ 382/100; 707/3; 382/305
(58) Field of Classification Search ................ 382/100, 382/305; 701/213; 705/38, 51, 52; 707/1, 707/3, 100
See application file for complete search history.

(56) References Cited
U.S. PATENT DOCUMENTS

| | | | | |
|---|---|---|---|---|
| 4,964,060 A | * | 10/1990 | Hartsog | 703/1 |
| 6,766,322 B1 | * | 7/2004 | Bell | 707/10 |
| 7,092,957 B2 | * | 8/2006 | Klein | 707/102 |
| 7,171,389 B2 | * | 1/2007 | Harrison | 705/51 |
| 2004/0117777 A1 | * | 6/2004 | Lichana | 717/151 |
| 2006/0089842 A1 | * | 4/2006 | Medawar | 705/1 |
| 2006/0136126 A1 | * | 6/2006 | Coombes et al. | 701/208 |

* cited by examiner

Primary Examiner—Kanji Patel
(74) Attorney, Agent, or Firm—P. B. Tufariello Intellectulaw

(57) ABSTRACT

A system for the determination of the percentage of area of a parcel of land available for development or preservation which comprises at least one privately gathered data base having at least one file relating to at least one geographic area and its privately gathered corresponding map, physical, geographic, geologic, edaphic, and flora parameters present in and relating to said geographic area; a Software Decision Control Framework connected to the privately gathered data base; a Geographic Information System connected to and interacting with both the Software Decision Control Framework and the privately gathered data base; a network connected and interfaced to the Software Decision Control Framework and at least one data base interfaced with the network, the data base comprising physical, geographic, geologic, edaphic and flora parameters present in and relating to various geographic areas worldwide, whereby the Software Decision Control Framework interacts with the privately gathered data base, the Geographic Information System, the network and the database to provide an evaluation report which identifies, quantifies and establishes the percentage of area of the parcel of land for development and preservation in conformance to local, federal and state land use regulations and non-governmental land use policies.

14 Claims, 39 Drawing Sheets

VALID FOR THE PERIOD SHOWN

|  | Total Gross Acres in Parcel |  | 837 |
|---|---|---|---|
|  | Utilities | 0 | 0.00 % |
|  | Suspected Riparian | 0 | 0.00 % |
|  | Streams & Rivers (Watercourse) | 6 | 0.72 % |
|  | Riparian Zone | 123 | 14.70 % |
|  | Steep Slope | 67 | 8.00 % |
|  | Aquifer | 0 | 0.00 % |
|  | Flood Zone | 0 | 0.00 % |
| TOTAL CONSTRAINED AREA ||| 196.00 |
| TOTAL UNCONSTRAINED AREA ||| 641.00 |
| ESTIMATED ROAD & UTILITY DEDUCTIONS ||| -128.20 |
| TOTAL ESTIMATED DEVELOPABLE AREA ||| 512.80 |
| TOTAL ESTIMATED DEVELOPABLE AREA IN PERCENT ||| 61.27 % |
| SOIL VIABILITY GRADE ||| A |
| FVI ||| IIA |

The FVI is a tool designed for the evaluation of the development potential of real property. It is not intended to carry a project through any planning or approval process and is in no way a warranty or representation that approvals from any agencies or municipalities having jurisdiction will be obtained. It is based on mathematical analysis of existing maps and aerial photography and does not include physical inspection nor does it include regulatory confirmation of any environmental or physical constraints which may exist on a given property. All areas are approximate. Vendor liability for this product is expressly limited to the amount paid therefore.

Copyright 2004, RAFTER F, INC.

FIGURE 4

FVIGen
Folchetti Viability Index Generator

Getting Started

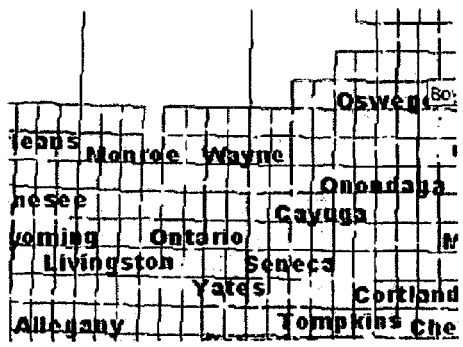

Several types of map files will be downloaded from various sources during this process. These files should be stored in a central repository on a local server or harddrive.

A directory structure should be created that will make these files easy to locate.

Setup file tree as follows:

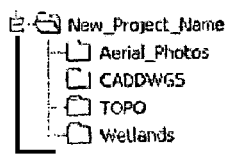

NOTE: Do not include spaces within folder names.

Next...Downloading the Topography

Cancel & return to previous menu

Cancel & return to Main Menu

Powered by Desktop Solutions

FIGURE 6(a)

Downloading the Topography

-Right click on the NYS GIS Clearinghouse Homepage below, and click "Open in New Window".

- www.nysgis.state.ny.us/

Step 1. Scroll down and click on the Raster Imagery link (left side of page).

Step 2. Click on the Digital Raster Quadrangle link (top center of page).

Step 3. Click on the New York State 1:24,000 Digital Raster Quadrangles (NYSDOT & USGS) link (bottom center of page).

Step 4. Using the interactive map, hold your mouse pointer over the quadrangle for 1-2 seconds and the quadrange name will appear. Select the Quadrangle which contains your targeted property.

NOTE: BE SURE TO NOTE THE QUADRANGLE NAME! You will use this name when downloading the aerial photos.

Step 5. Preview the selected Quadrangle to determine if it is the correct file, i.e. your target property is located in that quadrange.

Step 6. Download the Quadrangle into the TOPO folder created during the file tree setup, and close the web-browser window.

Step 7. The Quadrangle is a .zip file and must be unzipped. Extract the file into the TOPO folder.

The end result will look like this:

| Name | Size | Type |
|---|---|---|
| bb44 | 1,235 KB | WinRAR ZIP archive |
| bb44plan | 1 KB | TAB File |
| bb44plan.tfw | 1 KB | TFW File |
| bb44plan | 515 KB | TIF Image Document |
| bb44topo | 1 KB | TAB File |
| bb44topo.tfw | 1 KB | TFW File |
| bb44topo | 811 KB | TIF Image Document |

The two files you will be using are the topo.tif and plan.tif image documents.

Next...Downloading the Aerial Photos

FIGURE 6(b)

Downloading the Aerial Photos

-Right click on the NYS GIS Clearinghouse Homepage below, and select "Open in New Window".

- www.nysgis.state.ny.us

Step 1. Scroll down and click on the Orthoimagery Application link (left side of page).

Step 2. Click on the Direct Download link for the most recent date available (left side of page).

Step 3. Select the County your target property is located in.

Step 4. Select the City or Town your target property is located in.

NOTE: If the name of the topo quadrangle is not on the list, go back to Step 2 and select a later imagery date date.

NOTE: On the later dated imagery, you will use an interactive map to select the area your target property is located in.

Step 5. Once you find the photos for your Quadrangle, download all .sid and .aux files into the Aerial Photos folder created during the file tree setup.

NOTE: There is likely to be several files for each Quadrangle, make sure you get them all.

The end result will look like this:

FIGURE 6(c)

| Name | Size | Type |
|---|---|---|
| GoshenNE_tile0.aux | 9 KB | AUX File |
| GoshenNE_tile0 | 1,456 KB | SID File |
| GoshenNE_tile1.aux | 9 KB | AUX File |
| GoshenNE_tile1 | 1,446 KB | SID File |
| GoshenNE_tile2.aux | 9 KB | AUX File |
| GoshenNE_tile2 | 1,145 KB | SID File |
| GoshenNE_tile3.aux | 9 KB | AUX File |
| GoshenNE_tile3 | 1,434 KB | SID File |
| GoshenNW_tile0.aux | 9 KB | AUX File |
| GoshenNW_tile0 | 1,466 KB | SID File |
| GoshenNW_tile1.aux | 9 KB | AUX File |
| GoshenNW_tile1 | 1,452 KB | SID File |
| GoshenNW_tile2.aux | 9 KB | AUX File |
| GoshenNW_tile2 | 1,136 KB | SID File |
| GoshenNW_tile3.aux | 9 KB | AUX File |
| GoshenNW_tile3 | 1,400 KB | SID File |

Next...Starting a New Map

Cancel & return to previous menu

Cancel & return to Main Menu

Powered by Desktop Solutions

FIGURE 6(d)

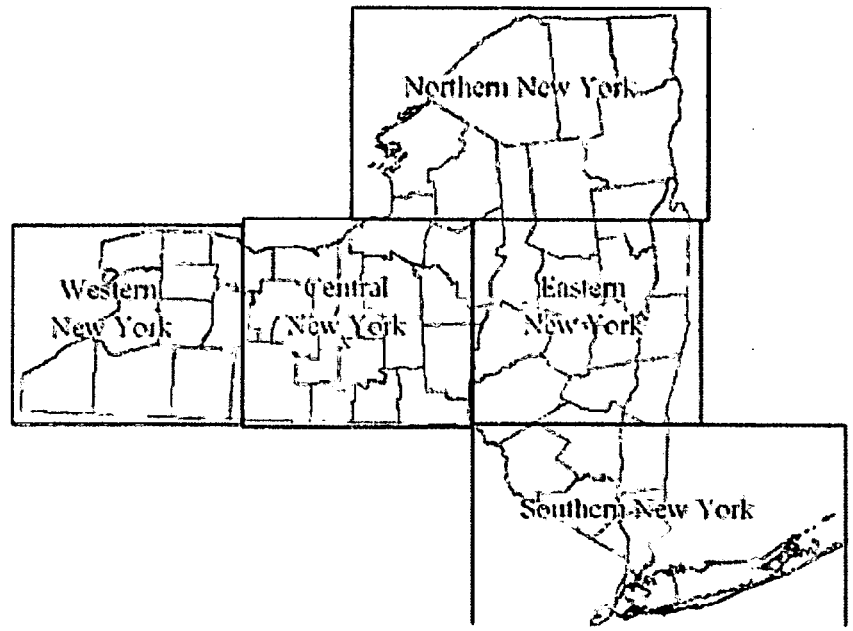
Using the map similar to the one above, select the Region in which property is located.
Cancel & return to previous menu
Cancel & return to Main Menu
Powered by Desktop Solutions
FIGURE 6(e)

FVIGen
Folchetti Viability Index Generator www1.nysgis.state.ny.us - /downloadable/H9/

[To Parent Directory]

| Date | Time | Size | Filename |
|---|---|---|---|
| 12/4/02 | 12:47 PM | 0058 | BrewsterHZ_tile0.aux |
| 12/23/99 | 5:41 PM | 192 | BrewsterHZ_tile0.sdw |
| 12/23/99 | 5:41 PM | 1478234 | BrewsterHZ_tile0.sid |
| 12/23/99 | 4:00 PM | 367 | BrewsterHZ_tile0_sid.tab |
| 12/4/02 | 12:47 PM | 0853 | BrewsterHZ_tile1.aux |
| 12/23/99 | 5:41 PM | 192 | BrewsterHZ_tile1.sdw |
| 12/21/99 | 5:42 PM | 1526241 | BrewsterHZ_tile1.sid |
| 12/23/99 | 4:00 PM | 367 | BrewsterHZ_tile1_sid.tab |
| 12/4/02 | 12:47 PM | 8252 | BrewsterHZ_tile2.aux |
| 12/23/99 | 5:42 PM | 192 | BrewsterHZ_tile2.sdw |
| 12/23/99 | 5:43 PM | 1370183 | BrewsterHZ_tile2.sid |
| 12/23/99 | 4:00 PM | 467 | BrewsterHZ_tile2_sid.tab |
| 12/4/02 | 12:47 PM | 0052 | BrewsterHZ_tile3.aux |
| 12/23/99 | 5:43 PM | 192 | BrewsterHZ_tile3.sdw |
| 12/23/99 | 5:43 PM | 1414060 | BrewsterHZ_tile3.sid |
| 12/23/99 | 4:00 PM | 367 | BrewsterHZ_tile3_sid.tab |
| 12/4/02 | 12:49 PM | 0358 | BrewsterNY_tile0.aux |
| 12/10/99 | 12:49 PM | 192 | BrewsterNY_tile0.sdw |
| 12/10/99 | 12:49 PM | 1539716 | BrewsterNY_tile0.sid |
| 12/18/99 | 12:22 PM | 367 | BrewsterNY_tile0_sid.tab |
| 12/4/02 | 12:47 PM | 8852 | BrewsterNY_tile1.aux |
| 12/16/99 | 12:49 PM | 192 | BrewsterNY_tile1.sdw |
| 12/10/99 | 10:50 PM | 1476676 | BrewsterNY_tile1.sid |
| 12/10/99 | 12:22 PM | 367 | BrewsterNY_tile1_sid.tab |
| 12/4/02 | 12:47 PM | 8852 | BrewsterNY_tile2.aux |
| 12/10/99 | 12:50 PM | 192 | BrewsterNY_tile2.sdw |
| 12/19/99 | 12:51 PM | 1450422 | BrewsterNY_tile2.sid |
| 12/10/99 | 12:22 PM | 367 | BrewsterNY_tile2_sid.tab |
| 12/4/02 | 12:47 PM | 0853 | BrewsterNY_tile3.aux |
| 12/16/99 | 12:51 PM | 192 | BrewsterNY_tile3.sdw |
| 12/10/99 | 12:51 PM | 1437215 | BrewsterNY_tile3.sid |

Select and download the AUX and SID files for the correct quadrangle.

Cancel & return to previous menu

Cancel & return to Main Menu

Powered by Desktop Solutions

FIGURE 6(f)

FVIGen
Folchetti Viability Index Generator
Setting up ArcMap
Step 1. Open the ArcMap program (Start>Programs>ArcGIS>ArcMap).
Step 2. Select the "New empty map" option, and click OK.
Step 3. Right-click the "Layers" folder located on the left side of the screen, then scroll down and select "Properties".
You should see a box on the screen like this:
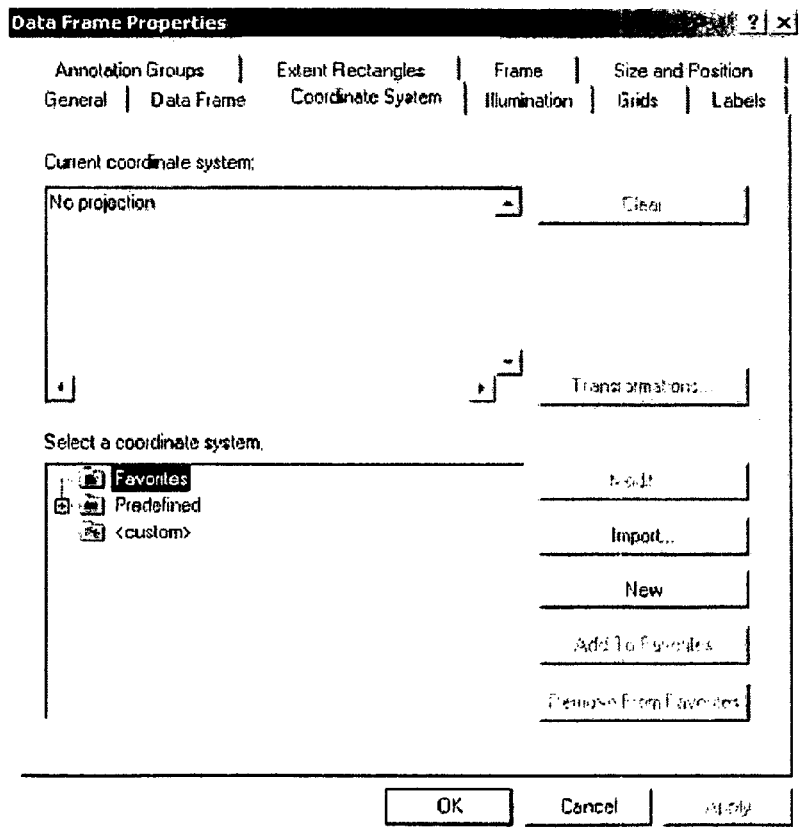
FIGURE 6(g)

Step 4. Select the "Coordinate System" tab, as shown above.

Step 5. Expand the "Predefined" folder located in the box labled "Select a coordinate system" (bottom left of the window).

Step 6. Expand the "Projected Coordinate Systems" folder.

Step 7. Expand the "State Plane" folder.

Step 8. Expand the "NAD 1983 (feet)" folder.

Step 9. Choose the NAD 1983 State Plane New York....coordinate system.

NOTE: You will have to determine where in New York, geographically, and choose the correct setting from the four options below:

> NAD 1983 StatePlane New York Central FIPS 3102 (F
> NAD 1983 StatePlane New York East FIPS 3101 (Feel
> NAD 1983 StatePlane New York Long Island FIPS 31C
> NAD 1983 StatePlane New York West FIPS 3103 (Fee Step 10. Once you have the correct coordinate system selected, click "Apply" then "OK".

Next....Adding the Aerial Photos

Cancel & return to previous menu

Cancel & return to Main Menu

Powered by Desktop Solutions

FIGURE 6(h)

Adding the Aerial Photos in ArcMap

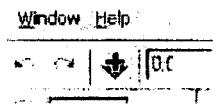

Step 1. Click on the "Add Data" button 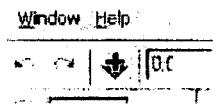 or select "Add Data" from the File menu.

Step 2. Click on the "Connect to Folder" button 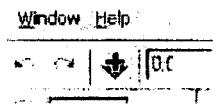

Step 3. Browse for the folder you created earlier containing the Aerial Photos.

Step 4. Once the "Aerial_Photo" folder is found, select all desired files (ex. QuadrangleNE_tile0.sid) and click "Add".

NOTE: All of the files can be added at once by holding the "Shift" or "Ctrl" keys and highlighting each file.

Next...Adding the Topography

Cancel & return to previous menu

Cancel & return to Main Menu

Powered by Desktop Solutions

FIGURE 6(i)

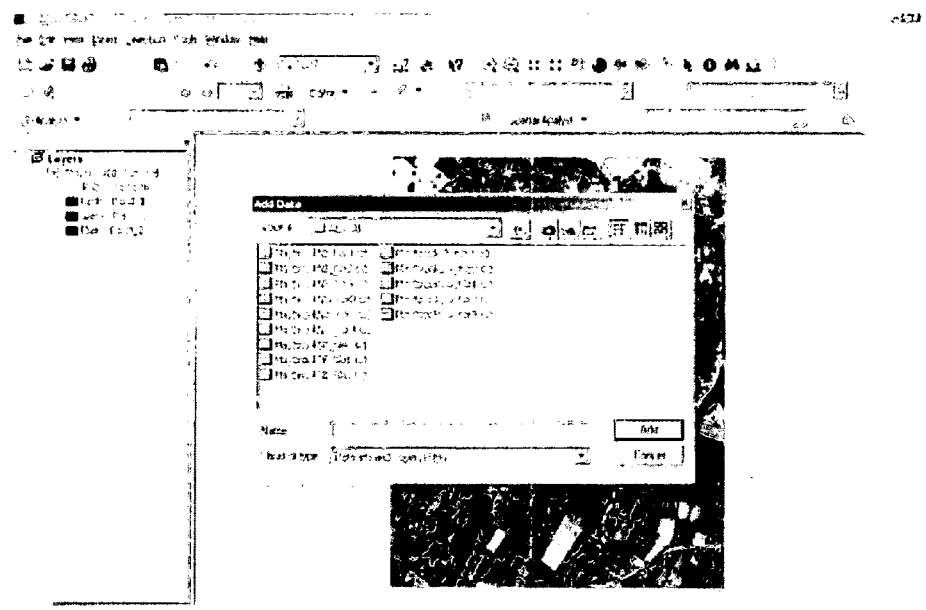
- Once folder is found, select desired files (all files can be added at once by holding the Shift or Ctrl keys)
- When adding Aerial Photos, click on the downloaded image (ex: QuadrangleNE_tile0.sid) and click "Add" for color photos
Cancel & return to previous menu
Cancel & return to Main Menu
Powered by Desktop Solutions
FIGURE 6(j)

Adding the Topography in ArcMap

Step 1. Click on the "Add Data" button          or select "Add Data" from the File menu.

Step 2. Click on the "Connect to Folder" button 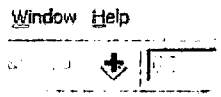

Step 3. Browse for the folder you created earlier containing the topography.

Step 4. Once the "TOPO" folder is found, add both the Topo and Plan files (ex. bb40topo.tif and bb40plan.tif).

NOTE: Both of the files can be added at once by holding the "Shift" or "Ctrl" keys and highlighting each file.

NOTE: Adding these files may take a number of minutes.

Next....Managing Transparancy

Cancel & return to previous menu

Cancel & return to Main Menu

Powered by Desktop Solutions

FIGURE 6(k)

Removing the White Background

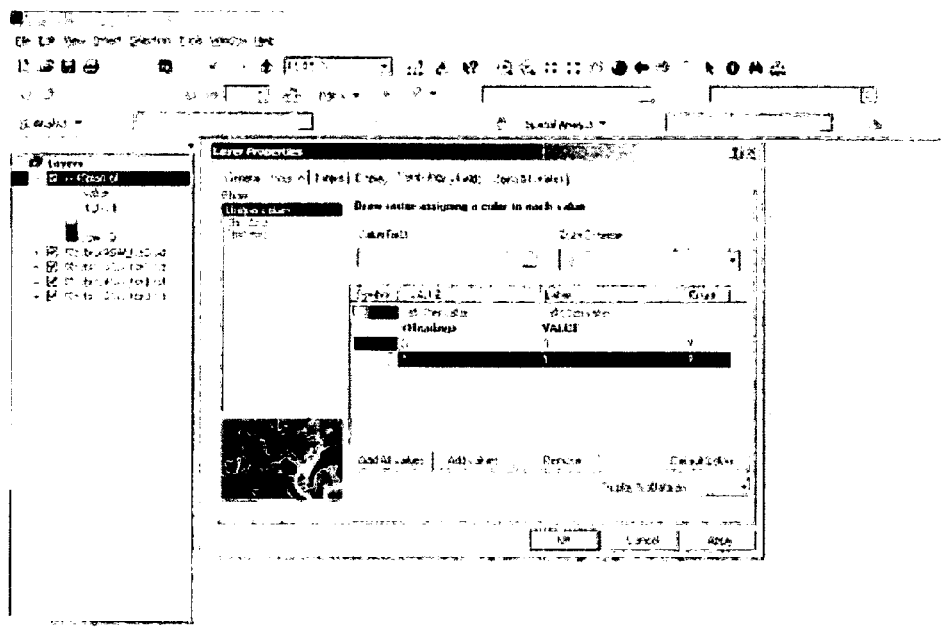

Step 1. Look under the Layers heading in the module on the left of the screen. Right-click on one of the .tif files (ex. either bb40plan.tif or bb40topo.tif).

Step 2. Scroll down on the right-click menu and select properties.

Step 3. When you see the properties menu (shown above), select the Symbology tab.

Step 4. In the box on the left of the Symbology screen titled "Show", click on the Unique Values listing.

Step 5. In the box located on the lower center of the Symbology screen, select the white box as shown above, then click Remove (bottom of screen) then OK.

Next...Setting Up AutoCad

Cancel & return to previous menu

FIGURE 6(I)

Folchetti Viability Index Generator

Setting Up AutoCad

Step 1. Open AutoCad Land Development Desktop.

Step 2. Select Projects from the menu bar, scroll down and select Drawing Setup.

Step 3. In the Drawing Setup menu, choose the Zone Tab.

Step 4. Pull down the Categories menu and choose UTM, NAD 83 Datum (located at the bottom of the list).

Step 5. In the large box titled "Available Coordinate Systems" choose UTM with NAD 83 datum, Zone 18, US Foot; Central Meridian, 75dW.

At this point, your Drawing Setup menu should look like the this:

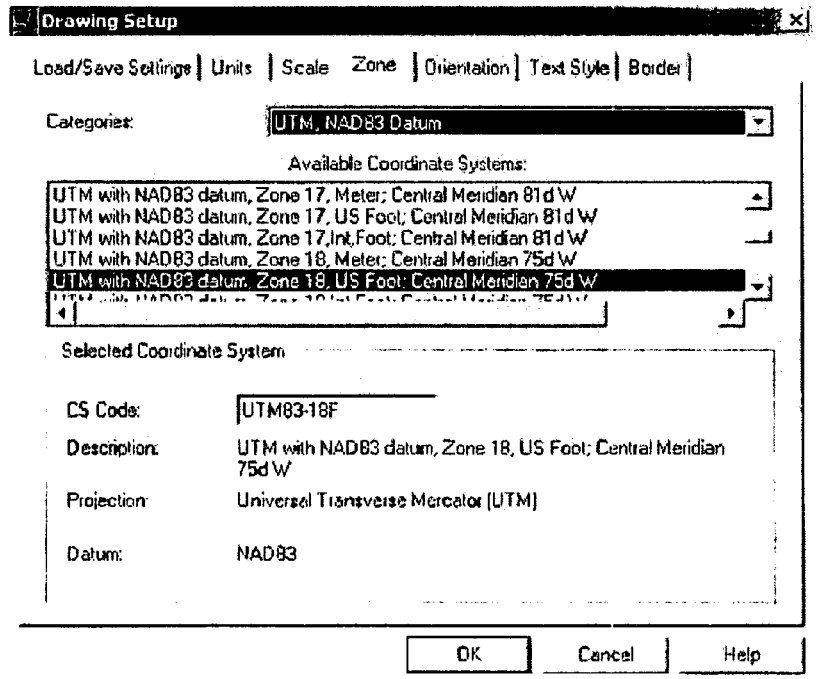

FIGURE 6(m)

If so, click OK and move forward.

Step 6. Insert the raster images downloaded previously, type Image into the autocad command line.

Step 7. Browse for, and attach your file (ex. bb40plan.tif). Make sure you insert the file with a scale of 2,003. It should look like the image below. Add both the .tif files you downloaded previously (ex. bb40plan.tif and bb40topo.tif).

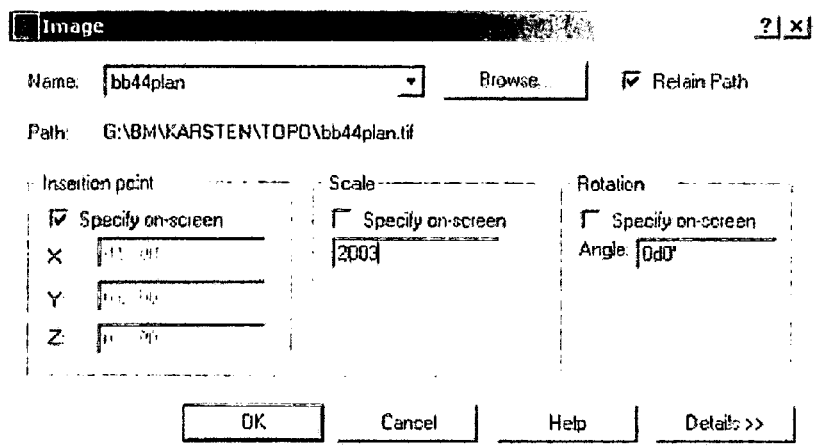

Step 8. Lining up the drawings in ArcMap and AutoCad:

- In ArcMap, place your mouse cursor over a known point, for example a road intersection, and record the coordinates (ex. 123456, 654321).
- Return to AutoCad and move the image to that location.
    - Type "Move" into the commad line
    - Select the object you want to move (i.e. the image file)
    - Next, select the basepoint for the move. This is the SAME point you determined the coordinates for in ArcMap.
    - Now, enter the coordinates (ex. 2100.9832,703.5166) Make sure you DO NOT use a space after the comma when entering the coordinates.

Next....Special Note on AutoCad Files

Cancel & return to previous menu

Cancel & return to Main Menu

Powered by Desktop Solutions

FIGURE 6(n)

Notes on Drawing File Management

Each category of drawing (property lines, steep slopes, setbacks, wetlands, etc.) must be saved in it's own distinct file. Example:

| Name | Size | Type |
|---|---|---|
| PropertyLines | 27 KB | AutoCAD Drawing |
| Wetlands | 29 KB | AutoCAD Drawing |
| Streams | 32 KB | AutoCAD Drawing |
| SteepSlopes | 29 KB | AutoCAD Drawing |

So, the stream file should only contain the streams, the steep slope file should only contain steep slopes, etc.

This is because, when imported into ArcMap, all lines from the drawing will be inserted as one color. Even though you have different layers with different colored lines in AutoCad, they will not be imported that way.

In order to decipher the difference between each constraint, save each constraint in a differnt file, and use ArcMap to change the line color, weight, etc.

Next...Drawing the Property Lines in AutoCad

Cancel & return to previous menu

Cancel & return to Main Menu

Powered by Desktop Solutions

FIGURE 6(o)

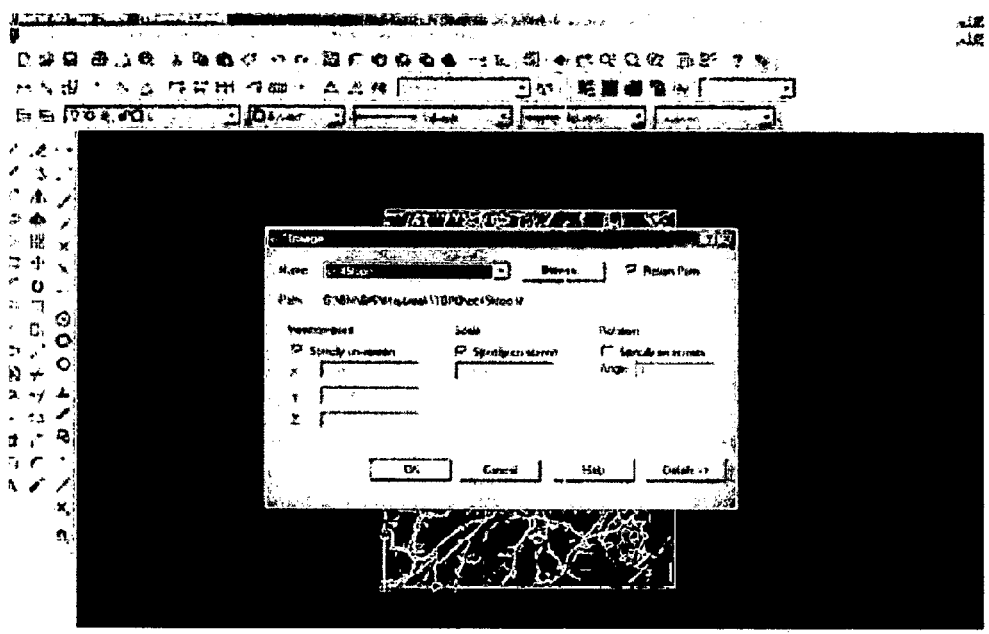
- Click "Add Data" button
- find desired Cadd drawing
- double-click on drawing file
- select between Annotation, Point, Polygon, Polyline
- "Add"
Cancel & return to previous menu
Cancel & return to Main Menu
Powered by Desktop Solutions
FIGURE 6(p)

Drawing the Property Lines

Step 1. Go to ArcMap and center the view on the subject property (or as close as you can get it).

Step 2. Compare the tax map of the subject property with the ArcMap view showing the aerial photos and topography.

Step 3. Determine a good starting point, i.e. easily identifiable corner of lot, etc.

Step 4. Hold your mouse cursor over that spot in ArcMap and record the coordinates for that point (123456, 654321).

Step 5. Find the next turnpoint, corner etc, of the property line on ArcMap and record that coordiante. (Make sure it directly connects to the first point). So, try to go point to point in a clockwise or counterclockwise direction around the property.

Step 6. After recording all of the coordiates for the property, maximize AutoCad on your screen.

Step 7. In AutoCad, typ pline in the command prompt.

Step 8. The next command will ask you to enter a start-point. Enter the first coordinate you determined (ex. 2100.9856,703.5516). The start of a line will be drawn at that point.

Remember DO NOT use a space after the comma separating the X and Y coordinates!

Step 9. The next command will ask you to specify the next point. Enter the next coordinate you determined. Continue this until you have the entire perimeter of the property line drawn.

Step 10. Save the file in the CADDDWGS folder of the file tree we set up earlier. Be sure to name the file "PropertyLines" with no spaces between words.

Next...Drawing the Constraints

Cancel & return to previous menu

Cancel & return to Main Menu

Powered by Desktop Solutions

FIGURE 6(q)

Drawing the Constraints

Step 1. Many Streams/Rivers are given on the "plan.tif" file that is downloaded with the topography. In AutoCad, A polyline can be drawn over the lines that are given on the image.

Step 2. Some streams/rivers and suspected wetlands are not given on the plan but are visible from the aerial photography. Using the coordinate system within ArcMap, these areas can be drawn in AutoCad, use the same method as when drawing the property lines.

Step 3. Save the AutoCad drawing as Streams_Wetlands.dwg in the CADDWGS folder we created earlier.

Next...Adding Setbacks

Cancel & return to previous menu

Cancel & return to Main Menu

Powered by Desktop Solutions

FIGURE 6(r)

Adding the Setbacks

Setbacks can be found by offsetting the stream and suspected wetland polylines that are drawn in AutoCad by 100 feet (or what is specified by the local code). This is the given distance needed between bodies of water and construction activities.

These lines should be trimmed and joined into one enclosed polyline to enable finding the areas.

Step 1. Open the AutoCad drawing you created the streams in.

Step 2. in the command line, type "offset". You will then be prompted to enter an offset distance. Enter the setback required by your local code, hit enter.

Step 3. You will now be prompted to select the object you want to offset, choose the polyline representing the stream, wetland, etc.

Step 4. You will now be prompted to specify which side to offset the object, click on one side of the line to offset it the distance you entered. Do this on both sides of the line.

Step 5. Repeat this process for all streams, wetlands, etc. that must be maked as constraints.

Next....Adding Soil Types to the Map

Cancel & return to previous menu

Cancel & return to Main Menu

Powered by Desktop Solutions

FIGURE 6(s)

Adding the Soil Types

- From County Soil Survey Maps, select constant points from soil maps and aerial photos obtained at NYSGIS Clearinghouse

- Using the soil maps, scale the distances from the constant points to the Soil Type Boundary lines to obtain numerous points around the boundaries (all corners, abnormalities, etc.) then connect all points around the specified boundaries

- Draw the boundaries within AutoCad using the constant points and scaled dimensions Within ArcMap:

- Once the boundaries are drawn, insert into ArcMap using same steps as inserting Cadd drawings before (Insert data, select drawing, polyline, etc.)

- To label the boundaries, go to the Insert drop-down menu, select Text and label according to the County Soil Survey Maps Cancel & return to previous menu Cancel & return to Main Menu Powered by Desktop Solutions FIGURE 6(t)

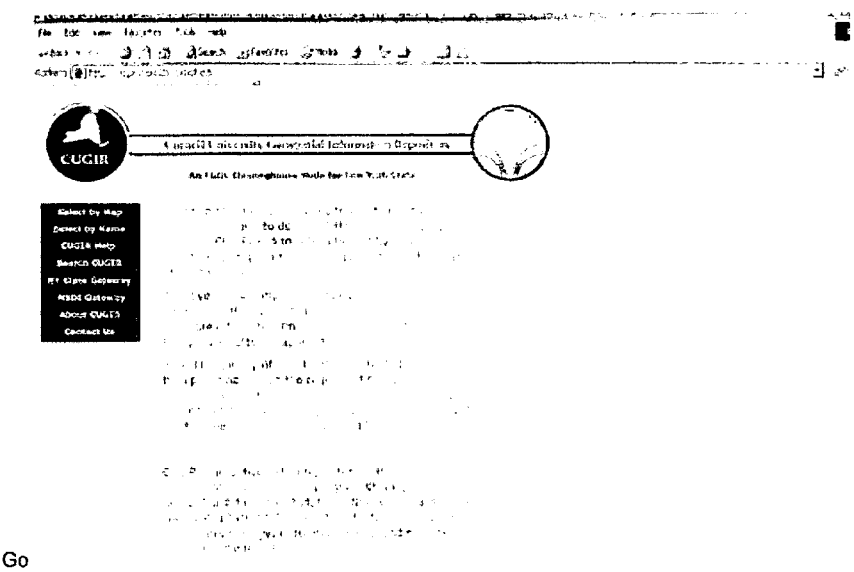
Go
Go to http://cugir/mannlib.cornell.edu
Cancel & return to previous menu
Cancel & return to Main Menu
Powered by Desktop Solutions
FIGURE 6(u)

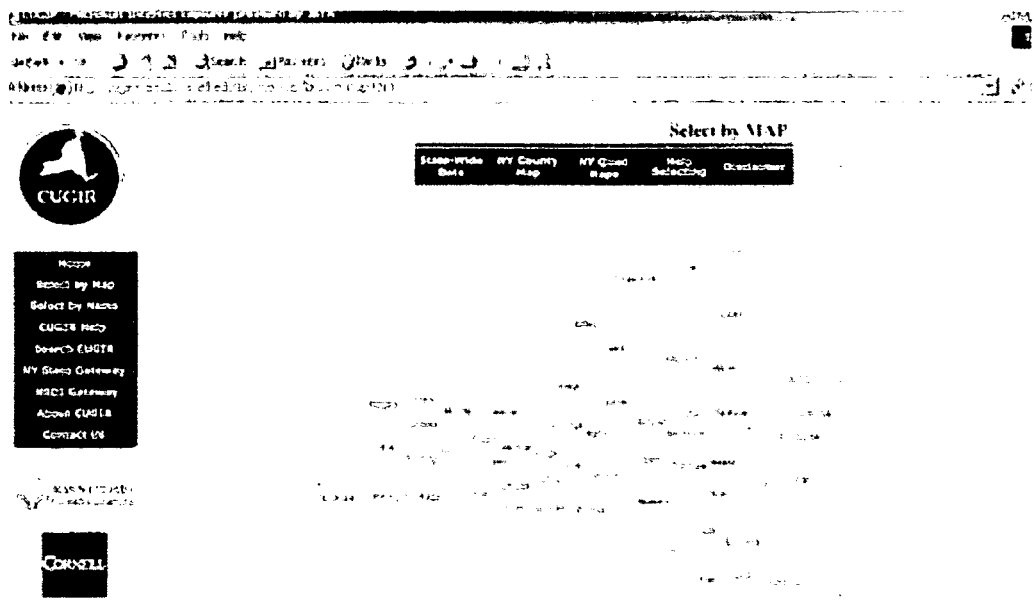
-Go to Select by Map
-Select County Property is in
Cancel & return to previous menu
Cancel & return to Main Menu
Powered by Desktop Solutions
FIGURE 6(v)

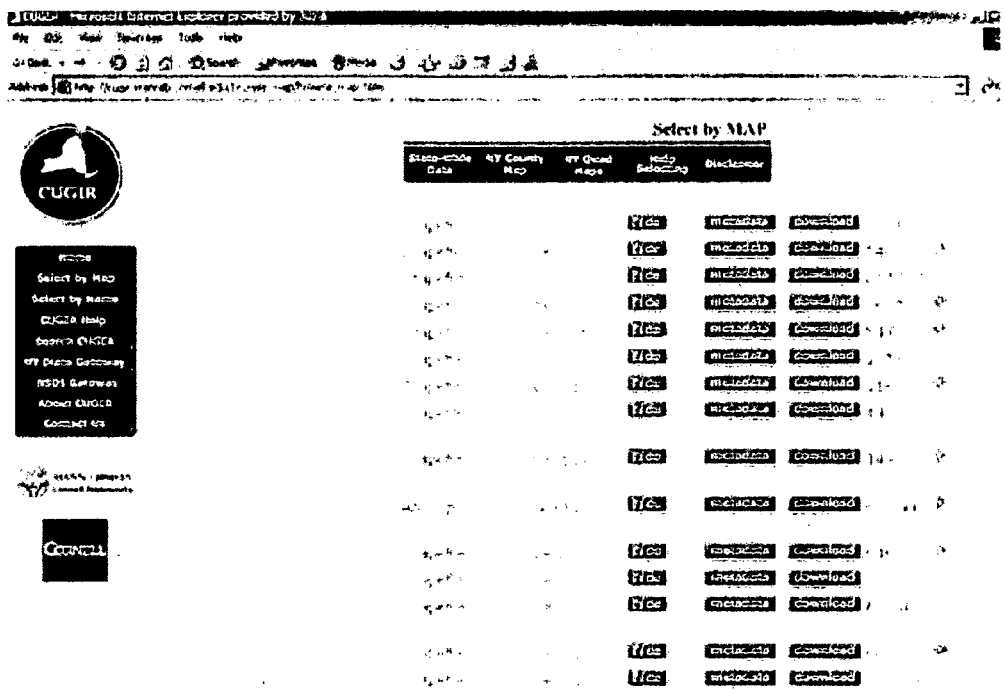
Select the 'download' button for the correct Freshwater Wetlands map, and save to a local folder. The folder name cannot contain spaces
Cancel & return to previous menu
Cancel & return to Main Menu
Powered by Desktop Solutions
FIGURE 6(w)

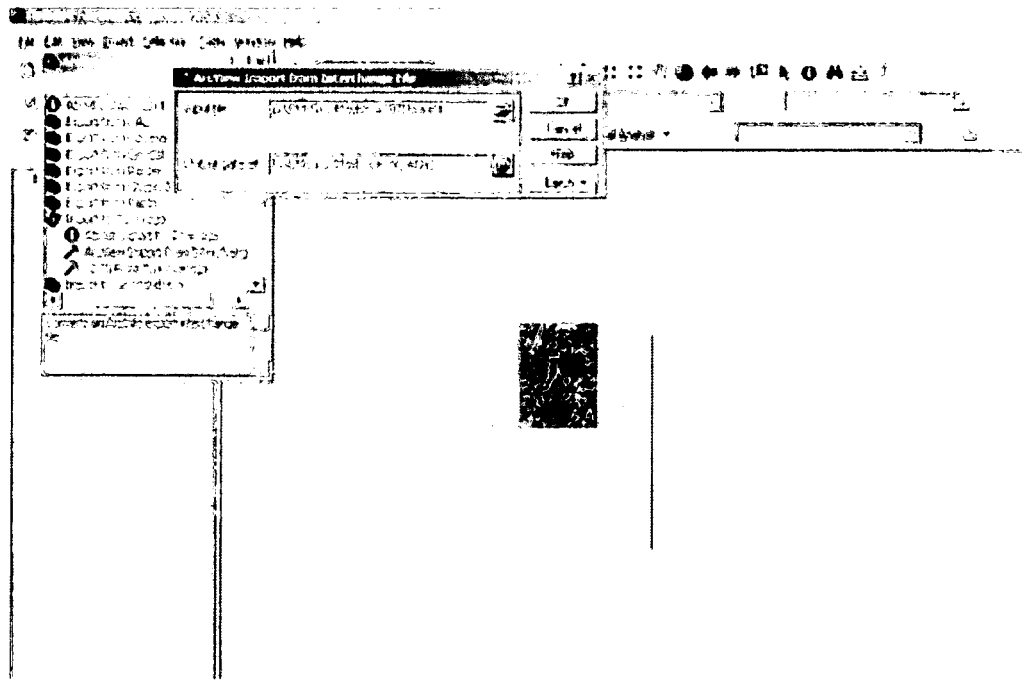

- Open ArcToolbox to convert file to a coverage
- Open the "Import to Coverage" file
- Select "ArcView Import from Interchange"
- Browse for File (.e00)
- Select the folder and file name which coverage is to be stored
- once file is converted, add like other files mentioned previously -annotation = wetland numbers

- arc = polyline

- label = cross near center of wetland

- polygon = shaded wetland

- tic = mark on wetland grid

Note: The "arc" should be added for desired effect

FIGURE 6(x)

FVIGen
Folchetti Viability Index Generator

- Steep slopes are areas in which the terrain has a slope of greater than that specified by the Town/Village Code.

-This is to be done by looking at the contours of the area and determining when the slope is under the specified conditions:

Rise/Run >= (check local codes)

Cancel & return to previous menu

Cancel & return to Main Menu

Powered by Desktop Solutions

FIGURE 6(y)

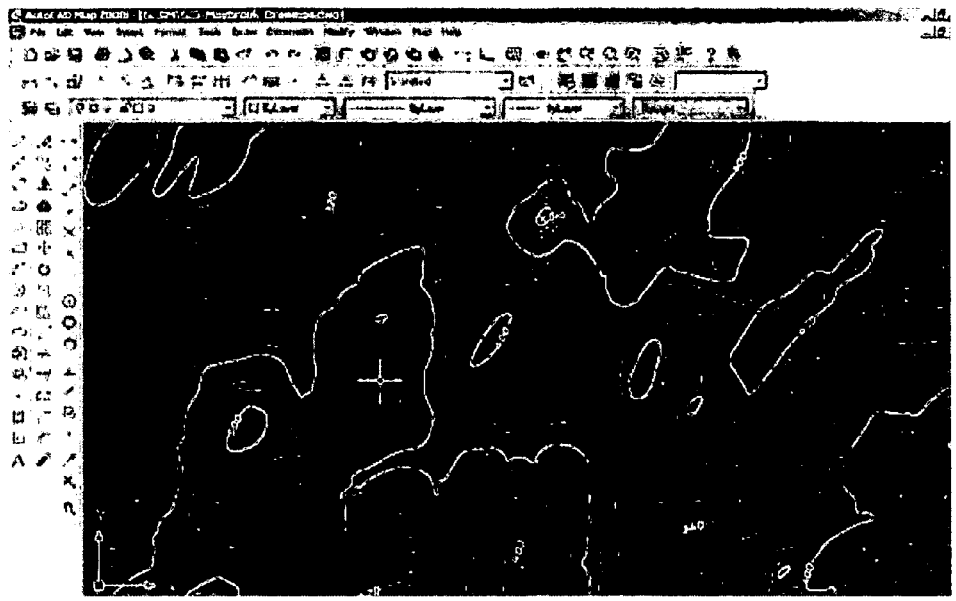

-Using the topo.tif image file that was brought into Autocad, find areas that are over the specified value for steep slopes.

-Check the contour intervals and measure the distance between the contour lines. If the Rise over Run value is greater than the needed value, it is considered a steep slope.

-Draw a polyline over the contour lines which are considered to be steep slopes. Note: It is best to connect the polylines to make calculating areas easier Cancel & return to previous menu Cancel & return to Main Menu Powered by Desktop Solutions FIGURE 6(z)

FVIGen
Folchetti Viability Index Generator

-Once all of the constraints (wetlands, steep slopes, setbacks, etc,) have been drawn in the correct area, the areas can be calculated within AutoCad.

- Within AutoCad, click on the desired constraint area polyline. Type the command "list", the area is given in square feet. Convert this number into acres (1 Acre = 43,560 sf).

-Find the areas of each of the specific constraints and subtract from total property area. This number will give the total developable area.

NOTE: In many cases there will be areas of overlap meaning, steep slope constraints are found within the same area as wetland setbacks. This area must be found so the area is not counted twice.

Cancel & return to previous menu

Cancel & return to Main Menu

Powered by Desktop Solutions

Getting Started

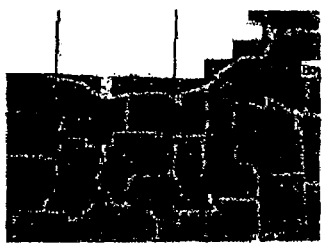

Several types of map files will be downloaded from various sources during this process. These files should be stored in a central repository on a local server or harddrive.

A directory structure should be created that will make these files easy to locate.

Setup file tree as follows:

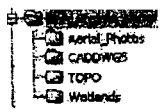

NOTE: Do not include spaces within folder names.

Next...Downloading the Topography

Cancel & return to previous menu

Cancel & return to Main Menu

Powered by Desktop Solutions

PROCESS, SYSTEM, OR METHOD FOR THE DETERMINATION OF THE PERCENTAGE OF AREA OF A PARCEL OF LAND AVAILABLE FOR DEVELOPMENT OR PRESERVATION AND THE PRODUCTION OF A REPORT AND MAP THEREFOR ON A FIXED TANGIBLE MEDIUM

BACKGROUND OF THE INVENTION

1. Field of the Invention

The present invention generally relates to a land use decision system, process or method. More particularly, the present invention relates to a geographic information/data management/data analysis system, encompassing physical, geographical criteria, including edaphic and floral data pertinent to land use decisions (hereinafter "land use constraints"), for the purpose of: (a) thoroughly mapping a particular land area; (b) identifying and quantifying the fractions of the land area that exhibit land use constraints; c) identifying and quantifying those fractions of the land area that are actually free of land use constraints, and (d) establishing the optimum use thereof in conformance to local, federal and state land use regulations and non-governmental land use policies; all before significant cost and expense is incurred and a land use decision is actually made.

2. Description of the Prior Art

There are instances when it becomes necessary to determine fractions of a particular parcel or area of land that exhibit certain land use constraints, the fractions of the parcel or area of land area that may actually be developable, and establishing the optimum use thereof in accordance with local, federal and state land use policies and land regulations. Such instances usually occur during the normal course of business of builders, land developers, financing entities, local state and federal government environmental agencies, local planning/zoning agencies, non-government environmental and sustainable growth agencies, land use professionals and others (hereinafter collectively "land use professionals"), who are regularly engaged in due diligence or evaluation of undeveloped parcels of land (hereinafter "the evaluation process").

Specifically, the evaluation process is performed to determine (I) whether the land use constraints in a particular parcel or area of land render that particular parcel or area of land acceptable or unacceptable for certain uses; (ii) whether the parcel or area of land is suitable for acquisition and development/preservation purposes; and (iii) how much of the parcel or area of land can actually be developed/preserved and whether it makes environmental or economic sense to do so.

The evaluation process has become necessary, due to the combination of public reaction to suburbanization and the increased social and scientific understanding of the impact of development on the environment. As government regulations, environmental and population pressures increase, the land use constraints considered in connection with specific land uses have and continue to undergo significantly increased scrutiny by an ever expanding array of public, private and activist agencies. Such considerations require the LUP to gather and analyze large amounts of information and data from a host of disparate sources. The data generally includes geographic location of the land, climate data, and detailed physical characteristics and land use constraints. It commonly includes but is not necessarily limited to topography, location of known riparian areas, location of suspected riparian areas, water bodies, buffer zones, soil classifications, vegetation types and cover, utilities, flood zones, groundwater aquifers, and slope of the land. The quantity and size of these land use constraints can and usually do result in significant land use decisions regarding a wide variety of potential uses for any given area of land.

Prior to the advent of computers, the LUP's collection of the data necessary for the evaluation process of any given parcel or area of land was extremely time consuming, expensive, and subjective. The majority of the data had to be collected manually and could not be efficiently combined into a single presentation for timely analysis, accurate evaluation and correct decision making. Certainly, the data could not be efficiently combined into a single presentation for timely analysis, accurate evaluation and correct decision making, even before the LUP had made the initial investment in the given parcel or area of land. Consequently, the extent of sub areas of land sensitive to land use constraints was essentially an educated guess that rarely provided the requisite level of accuracy, commensurate with the economic and environmental risk involved.

The evaluation process would begin with LUP's initial identification of the area of land or parcel to be analyzed. This was generally done by tax map identification, if available. A boundary survey prepared by a licensed surveyor could also have been used, but this was and still is, uncommon at this stage in the process. A visual survey of the area of land or parcel being scrutinized would then be conducted by the LUP physically walking the parcel or area of land around and within its perimeter. This walk would allow the LUP to develop some subjective understanding of the physical characteristics of the parcel or area of land. If available, a United States Geographic Survey (hereinafter "USGS") topographic map could be used to assist the LUP in understanding the characteristics of the land during this activity.

Based on the LUP's experience, physical condition, memory, note taking capability, cartographic sketching skills, orienteering/land navigation skills, range estimation skills and other similar variables, upon completion of such the walk, the LUP would then make an estimate of how much of the land was actually subject to land use constraints. It would be this walk-through estimate that the LUP would then use to make a decision as to potential use/preservation of, and/or acquisition of the parcel or area of land.

Such decision was made at a great risk and burden to the LUP because the LUP's decision depended on the subjective opinion of the individual performing the walk through. If the individual conducting the walk-through was wrong in his or her opinion of how much land was subject to land use constraints, the LUP could potentially incur significant liability, along with time and economic loss.

Once the LUP made the decision, on the basis of the information gleaned during the walk through of the land parcel, to go forward with a specific decision regarding potential use/preservation of, and/or acquisition of the land, the LUP had, and still has, to formally submit detailed land use plans for approval by any oversight agency. These plans typically present the parcel or area of land at a uniform scale and depict the parcel or area of land characteristics. Additionally, in order to meet local, regional, state and federal environmental regulations, they include a detailed depiction of all land use constraints.

In order to formally submit detailed land use plans for approval by any oversight agency at the scale and contour interval required, generally the LUP had the land area or parcel mapped by either a licensed surveyor or an aerial mapping company. The surveyor surveyed the land area or parcel, or the aerial photographer flew over the parcel or area of land of interest (hereinafter "the area") and took as many detailed aerial photographs of the area, as required, to create the map required. Both of these processes were and still are expensive and time consuming, particularly if they involved large tracts of land. The surveyor or the aerial mapping company then created the topographic map at the scale and contour interval required.

The completed area maps were then returned back over to the LUP for further analysis and identification of the area's land use constraints. The LUP, in turn, referred the completed area map to as many specialists as necessary, for the purpose of exhausting the potential sensitive receptors and constraints. Once all were identified and depicted on the area map, an accurate understanding of the potential uses of the parcel or area of land in question, was now possible.

Inevitably, a comparison of the walk-through results and report, to the specialized area plan prepared by the cartographer or map maker augmented by the various specialists, would clearly show that the specialized, focused area plan was more accurate, in that it better depicted the actual conditions prevailing on the parcel or area of land, and the areas that allowed for informed decisions regarding certain uses or protections. It was not uncommon for the more accurate specialized area plan to indicate that the actual constraints on the parcel or area of land, differed substantially from the constraints identified during the walk through. Accordingly, it was also inevitable to conclude that the decisions made on the basis of the initial walk-through were flawed, if not invalid and clearly erroneous.

Further, the comparison would result in a change of the developable and the necessarily preservable areas of the land area or parcel in question. Such change affected the environmental and economic viability of the parcel or area of land and frequently resulted in a loss of either significant areas of land worthy of certain protections, or in the significant loss of financial assets and time to the LUP. Clearly, the significant loss of financial assets and time to the LUP could have been avoided if a detailed compilation and accurate evaluation process of the land area or parcel in question had been available, prior to the decision to either protect or use a specific land area or parcel.

With the advent of personal computers and the world wide web, the LUP's collection of the data necessary for the evaluation process of any given land area or parcel should not be as time consuming, expensive, and subjective. For example, the LUP should be able use a Geographic Information System (hereinafter "GIS") to get preliminary aerial photos and feature characteristics map right at the very beginning, even before conducting a walk-through and making a decision as to potential use/preservation of, and/or acquisition of the land. However, this is not the case.

A GIS is used to assemble, store, manipulate and display geographically referenced information, such as data identified according to location, i.e., an object located at 36 degrees longitude, 122 degrees latitude. GIS technology may be used for a variety of purposes including scientific investigations, resource management, and development planning. A GIS may be used to model emergency response times or develop plans for wetland protection.

A GIS stores data as layers of information so as to make complex analysis of data possible. GIS systems work by associating the source data with location variables. The location may be specified as x, y, and z coordinates of longitude, latitude and elevation, or by systems such as zip codes, or highway mile designations.

Public and private data bases exist which may be entered directly into a GIS. Public data bases are often produced by Federal and/or State agencies, while private data bases are compiled and maintained by various private companies.

Methods or processes using a GIS to generate land data abound. One example is U.S. Pat. Nos. 6,708,117 B2 and 6,704,654 B2 directed to a method for making geospatial imagery data available to the public over a wide ranging communications network such as the internet. Geospatial images are acquired such as by aerial photography, and are digitized. Plural images are captured, each image covering a portion of th earth surface area of interest. Each image captures at least one characteristic of the portion of the area, such as by taking images in different frequency bands. Data from all images thus obtained is loaded in a common database, loaded into a computer, and integrated to create a single, resultant, collectively created, geospatial image stored in the computer. The integration process is performed so that a nearly seamless mosaiced image covering the entire area of interest is generated. The mosaiced image is stored in mosaic sector form.

Another example is United States Patent Application Publication No. 2004/0015434 A1 directed to a method for providing a structured framework to assist land use professionals and others in evaluating information about real estate disclosed. A geographic information system (GIS) with access to private and public data bases of real estate information is combined with software, to provide structure to real estate decision making processes. Additionally, access is provided to individuals which are experienced in the particular type of analysis being performed. The experienced individuals are able to assist throughout the evaluation process, if desired by the user. After a user chooses parameters for a request, the software interacts with the geographic information system (GIS) to retrieve the appropriate data. The software also provides access to additional relevant information if so desired by the user. By automating the framework around the GIS, the land use professional or other individuals requesting real estate information have a greater likelihood of considering all the relevant information available for the particular decision making process being executed.

Yet another example is United States Patent Application Publication No. US 2003/0217063 A1 directed to a database design modeling system for managing data facets for design scenarios as a collection of hierarchical unitized data alternatives. The database design's model allows for easy access to data while providing a single persistent location for any one specific data record, thereby reducing any problems associated with conventional data duplication. Further, all data stored within the database is unitized thus eliminating the need for the user to do the unit mapping. According to one aspect of the invention, a Relational Database Management System modeling system can be constructed that allows for exercising multiple "What if?" scenarios with minimal user intervention and errors by 1) storing data using a normalized hierarchical storage structure, 2) providing data address indirection means to access data available from a multitude of data sources, 3) providing an object model to leverage programmable support to eh orthogonal data views, and 4) providing a GIS client user interface allowing the user to construct a scenario and to view scenario results.

Still another example is United States Patent Application Publication No. 2003/0158668 directed to a geographical information system (GIS) and a method for geospatially mapping at least one parcel polygon within a geographical region and for displaying at least one specific attribute of each parcel polygon, i.e., a topological area within the given geographical region, as an attached attribute of latitude and longitude coordinates. The centroid or center point of each of the parcel polygons is determined and stored into conventional computer storage means. The latitude and longitude point feature at the centroid of each parcel polygon is established and similarly stored. A unique tax identification number, e.g. the Assessor Parcel Number or parcel identifier number is assigned to each of the point features. A correlation is then made between the unique tax identification number of the point feature to a text list of at least one attribute, e.g. the physical address of the parcel polygon, of each of the point features. This attribute becomes attached to each point feature. The resulting parcel polygon map and point features with one or more of the attached attributes can then be displayed within a GIS or CAD system to provide the user, for example, accurate locations of street addresses for use in environments that require pinpoint accuracy, such as emergency response Another example is U.S. Pat. No. 6,574,561 B2 directed to a system for automating the gathering of field information that describes the condition of specific geographical locations at specific times via a field information recording device having a GPS receiver for the recording and assignment of the space-time coordinates as information is gathered. The information and space-time coordinates are transmitted to a management center for processing over a communication network. Upon receipt, the field information is integrated into a geographic database such that the information generates a template showing the current state or condition of the identified geographical location on an automated basis. The template and the associated geographical portion of the geographical database are distributed to users via the Internet, intranet or other communication means.

Still another example is United States Patent Application Publication No. 2003/0088362 A1 directed to a system and method for generating custom geospatial information maps and precision corrected images, and allowing realtime interactive production of a desired output image by incorporating user selectable parameters that define various image synthesizing operations. A graphical user interface allows a user to specify parameters that define the desired output image via a remote computing device over a public access network such as the Internet. The parameters define image synthesizing operations such as area, projection, datum, fusion, masking, blending, mosaiking, resembling, and others. The desired output image is processed by an image assembly server according to the parameters and a variety of geospatial image data sources, and electronically delivered to a user via a public access network. The geospatial information may as be correlated with non-georeferenced data such that relevant associations between non-georeferenced data and the geospatial data are integrated in the output information product. A user may therefore receive a desired output image that conforms to a variety of user specified parameters interactively via an image assembly server and interactively update and refine the desired output image via the graphical user interface, thereby providing an active archive of a set of images that can be revised dynamically.

Another example is United States Patent Application Publication No. 2002/0145620 A1 directed to a method and apparatus for managing drawings, documents, and data associated with the management of property and subunits within a property using a graphical user interface (GUI) and a geographic information system (GIS). The user inputs the property address and selected property and subunit management data into a relational computer database. This information is geocoded onto a map in order to locate the property and subunits on the map in relation to nearby geographic features. The geocoded map is then linked with the relational database so that a depiction of the geographic location of the property and associated information concerning that property can be displayed. The user may query the database to retrieve desired inputted property and subunit management data and view the results of that query on said map or in a table. The use of GIS to manage drawings, documents, and data in this fashion facilitates the ability to efficiently query and track this information spatially across subject properties, and subunits within those properties, within a region, state, country, or globally.

Yet another example is U.S. Patent Application Publication No. 2001/0014185 A1 directed to a system that applies the latest technology related to compression, rendering, and geographical data processing to present an interactive interface to users, which enables them to efficiently manipulate maps and queries for information over the World Wide Web. The method includes a World Wide Web application to display GIS information and obtains user input, and a server application to process user input and to communicate with the database to retrieve or store data.

Still another example is U.S. Pat. No. 6,247,019 B1 directed to a GIS system in which topological information is classified as geometrical objects and uses a region identifier and a geometry attribute to reconstruct each topological feature. The invention starts from the geometrical objects representing topological features. Each geometrical object has an entry including a region identifier attribute and a geometry attribute defining the geometry of a complete representation of the feature. These geometrical objects are complete in that an entry of the object attribute includes a record for a geometry attribute defining the complete geometry of a complete representation of a topological feature. These complete geometrical objects need not inherit attributes from other objects. The objects are classified as either a polygon object, polyline object, point object or raster object and stored in a respective object-based database. Using this data structure, a topological region can be displayed in real time by accessing this object-based data structure and loading the data structure associated with the topological region into a buffer. The geometrical objects associated with the topological region are then fetched from the buffer and loaded into a virtual blackboard. The fetched geometrical objects are then drawn on a display in real time.

Another example is U.S. Pat. No. 5,652,717 directed to a system and method whereby geographically related information is received from a plurality of sources, such as orbiting satellites, reconnaissance aircraft, photographs, maps, remote computer terminals, and the like, and is processed and integrated into a generic GIS to provide expanded information due to the vast amount of data relating to geographic locations to increase the amount of information available and derivable. The processed data may be stored for later use, or it may be presented visually on a computer screen or printed to provide a hard copy. Interactive terminals may be used to provide data as desired in a real time setting. These data are manipulated to, (A) provide information of current value and utility to the user, and (B) to perform simulation of local/regional future scenarios to assess the sustainability of particular courses of action. The latter requires the merger of remote sensed, radar, or lidar imagery with change models, proposed development, video imagery and basic GIS mapping/attribute files manipulated with digital and image simulation software.

Another example is U.S. Pat. No. 5,528,518 directed to a portable data acquisition device, including a position-determining device and data collector, which determines and stores positional data associated with objects positioned in a geographical area within sight of the device. Data representative of attributes associated with the objects are also stored in the device. The data stored in the device can be transferred to processing circuitry of a computer and absolute positional coordinates of the objects are determined. The absolute positional coordinates and the data representative of the attributes associated with the objects are placed in files accessible by geographic information system (GIS) software which utilizes the data to form a geographic information system (GIS) database from which GIS maps may be formed.

Yet another example U.S. Pat. No. 5,418,906 is directed to a method which allows the user to convert several data layers from one GIS into another. The user creates a template map of the area of interest. The template is an "all points" map which, when graphed, would appear as a black polygon identical in shape to the area of interest. Using the first GIS, the template is converted to a file in bit-mapped format. All zero bits in this file are identified and their position in the file noted. This information is referred to as the transform function. For each data layer to be converted, the first GIS is used to display a map of the proper extent. This display is converted to a file in bit-mapped format and the transform function used to delete non-data bits which correspond to the zero bits identified in the template file. The resulting, modified, bit-map is imported into the second GIS.

Still another example is U.S. Pat. No. 5,414,462 directed to a method and apparatus for generating a comprehensive land survey map, in which an image base map of a geographical survey region and a legal description map for each land parcel or lot within the geographical survey region are stored in a geographic information system (GIS). A remote sensing device is utilized to collect precise position data at survey points located on, near or adjacent the parcel of interest. The precise position data generated by the remote device is supplied to the GIS, which uses the data to correlate and align the legal description map for the parcel of interest with a portion of the image base map to create a comprehensive survey map for the parcel.

A final example is U.S. Pat. No. 5,214,757 directed to an automated, fully transportable mapping system, which utilizes position information gathered from a Global Positioning Satellite (GPS) capture program to create new maps or annotate existing maps contained in a Geographic Information System (GIS) database, in real time. In addition, the invention displays position information captured by GPS in real-time, enabling users to track the path on which they are travelling. Attributes related to the position information may also be entered in real time, and are stored in a file for subsequent inclusion in a GIS database.

Even if in the initial stages an LUP could use a Geographic Information System (hereinafter "GIS") to get some of the information made available as a result of the innovations and improvements in the prior art set forth herein above, the LUP will still have to conduct a walk-through and make a decision on the basis of the walk-through as to potential use/preservation of, and/or acquisition of the land for the following reasons: (a) not all of the information relating to land use and preservation, i.e., geographic location of the land, climate data, and detailed physical characteristics and land use constraints such as topography, location of known riparian areas, location of suspected riparian areas, water bodies, buffer zones, soil classifications, vegetation types and cover, utilities, flood zones, groundwater aquifers, and slope of the land, is available on data bases accessible via the internet, or otherwise; (b) the information changes from locality to locality, county to county, state to state; and even if the information did not change and was in fact all available, c) the tools and procedures for accurately, precisely, and repeatedly synthesizing such information to generate meaningful and useful results, do not exist.

Consequently, the entire evaluation process is still burdensome, time consuming, expensive (albeit a bit less so), subjective, imprecise and dependent on the knowledge and the experience of the individuals, defined herein as land use professionals (hereinafter "LUPs") studying the land area or parcel. Furthermore, the process is still very difficult to standardize and reproduce so that the process can be validated and consistently repeated time and time again for precise, accurate and speedy results.

Accordingly, there is clearly a need for a method and apparatus that will provide the LUP a timely, reproducible, precise, accurate and inexpensive evaluation process before the LUP makes any substantial investment. Without such timely and accurate information the LUP will continue to make land use decisions that will result in adverse environmental and economic consequences. Further, there is clearly a need for a method and apparatus that will provide the LUP with the ability to develop an understanding of the scope of land use constraints early in the evaluation process, thereby providing the LUP with a unique decision making advantage.

OBJECTS OF THE INVENTION

IT IS THEREFORE AN OBJECT of the present invention to allow for a timely, inexpensive and totally objective collection of the data necessary for the evaluation process of any given parcel or area of land.

IT IS ANOTHER OBJECT of the present invention to reduce the manual collection of the data necessary for the evaluation process of any given parcel or area of land to an absolute minimum.

IT IS YET ANOTHER OBJECT of the present invention to completely eliminate the need for the manual collection of data necessary for the evaluation process of any given parcel or area of land at the early stages in the evaluation process, thereby providing the LUP with a unique decision making advantage.

IT IS STILL ANOTHER OBJECT of the present invention to provide a single presentation of data collected for any given parcel or area of land, for timely analysis, accurate evaluation and correct decision making, at the initial stages of the evaluation process.

IT IS A FURTHER OBJECT of the present invention to eliminate guesswork and provide the requisite level of accuracy to the very beginning stages of the evaluation process, commensurate with the economic and environmental risk involved.

IT IS ANOTHER OBJECT of the present invention to provide a process that is easy to standardize and reproduce so that the process can be validated and consistently repeated time and time again for precise, accurate and speedy results in the land evaluation industry.

IT IS YET ANOTHER OBJECT of the present invention to help prevent the LUP from making land use decisions that will result in adverse environmental and economic consequences.

These objects, as well as other objects and advantages will become apparent from the following disclosure.

SUMMARY OF THE INVENTION

The illustrative embodiment of the present invention provides a structured framework for the evaluation of (i) whether land use constraints in a particular area of land or parcel render that particular area of land or parcel acceptable or unacceptable for certain uses; (ii) whether the area of land or parcel is suitable for acquisition and development/preservation purposes; and (iii) how much of the area of land or parcel can actually be developed/preserved and whether it makes environmental or economic sense to do so. It comprises at least one Geographic Information System (GIS) with access to at least one private and at least one public data base of various physical, geographic, geologic, edaphic and flora parameter maps and information, and a Software Decision Control Framework providing structured analysis of said parameters for land use evaluation.

The Software Decision Control Framework might interact with either the GIS, and/or the databases to (I) identify and enter the total area of the parcel or area of land in acres; (ii) interact with the GIS to create a map of the parcel; (iii) identify, calculate and enter the total area of the land constraints in acres, by marking, via the GIS on the created map all of the land constraints in the parcel. Such land constraints include but are not limited to the steep slopes present on the land, riparian zones, suspected riparian zones, watercourses such as rivers and streams, estuaries, utilities, aquifers, soil types and flood zones, and soil grade calculations. Thereafter, (iv) identify, calculate and enter the total area of the setbacks of said land constraints in acres, by further marking, via the GIS, on the created map; and (v) analyze all of this information to determine how much of the area of the parcel can actually be developed or preserved.

BRIEF DESCRIPTION OF THE DRAWINGS

While the specification concludes with claims which particularly point out and distinctly claim the present invention, it is believed that the present invention will be better understood from the following detailed description taken in conjunction with the accompanying drawings in which like numerals represent identical elements and wherein:

FIG. 4 is one example of a written report generated by the illustrative embodiment of the present invention;

FIG. 6 is a sequence of screens followed by the illustrative embodiment of the present invention to train individuals in the use of the invention;

FIG. 7 is a set up of a file tree in the illustrative embodiment of the present invention for the easy retrieval of downloaded map files.

| LIST OF ELEMENTS AND THEIR RESPECTIVE IDENTIFYING NUMERALS | |
|---|---|
| NO | ELEMENT |
| 10 | Illustrative embodiment of the invention. |
| 20 | Engineer |
| 30 | Computer with display |
| 32 | Printer |

-continued

| LIST OF ELEMENTS AND THEIR RESPECTIVE IDENTIFYING NUMERALS | |
|---|---|
| NO | ELEMENT |
| 40 | public database |
| 50 | private database |
| 60 | Electronic device |
| 62 | Privately gathered database |
| 62A | File in privately gathered database |
| 64 | LUP data base |
| 68 | Work-in-Progress Data Base |
| 68A | Temporary file |
| 70 | Geographic Information System (GIS) |
| 80 | Software Decision Control Framework |
| 90 | Network |
| 100 | Training System |

DETAILED DESCRIPTION OF THE INVENTION

Figure 1:
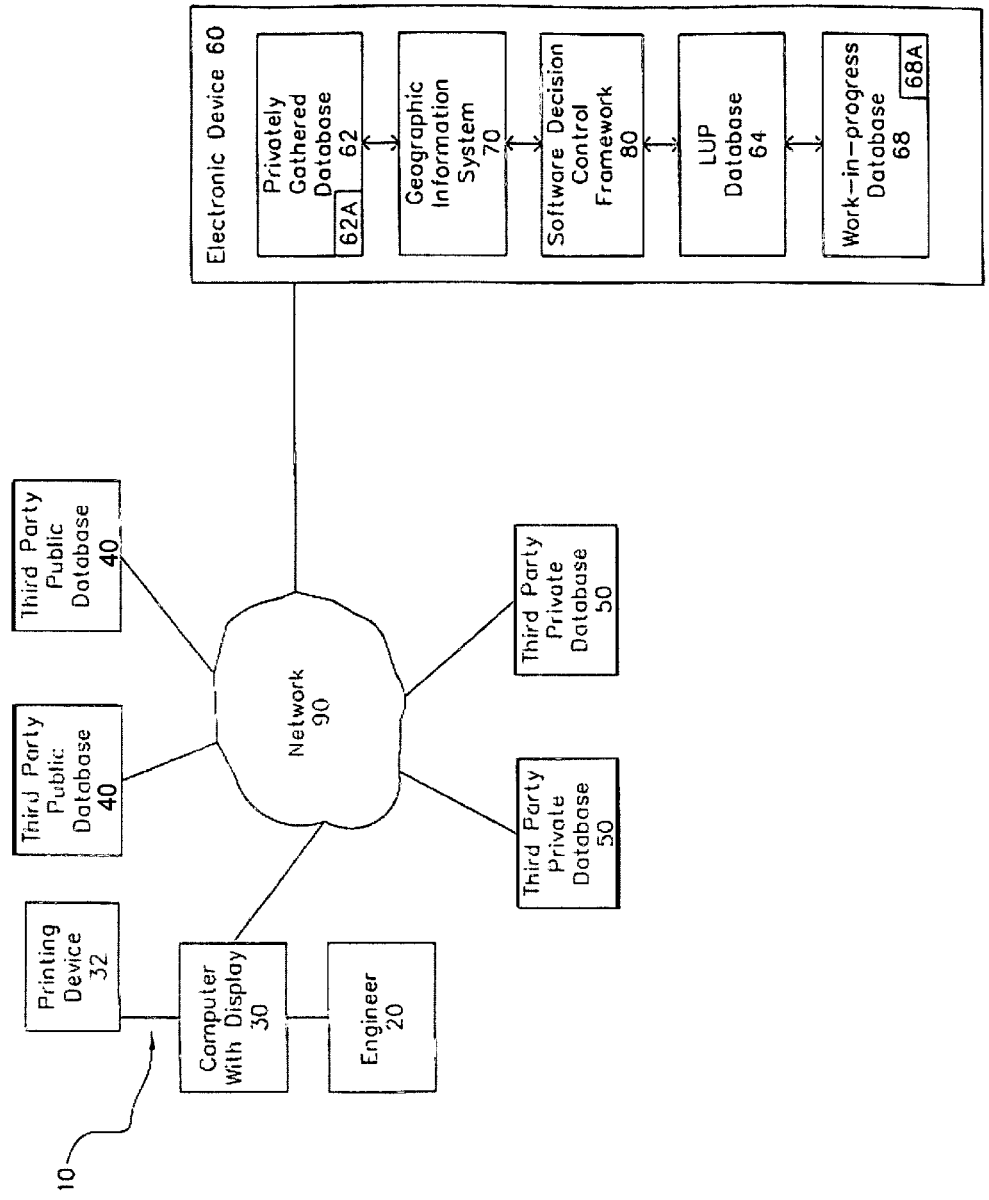
FIG. 1 is a block diagram of an environment suitable for practicing the illustrative embodiment of the present invention.

Referring more specifically to the drawings, FIG. 1 generally depicts the inventive method, process or system for an early determination of the best uses of an area of land or parcel, via the identification and quantification of various physical, geographic, geologic, hydrogeologic, edaphic and flora parameters and constraints present in the area of land and the production of a report and map therefor on a fixed tangible medium at 10. It is designed to antecede, if not completely replace the visual survey and walk-through of the early evaluation process of a parcel of land, and provide LUPs with the ability to develop an understanding of the scope of land use constraints thereof, early enough, and make a decision about the parcel of land before exposing themselves to great risk or investing great time, financial resources and effort.

It does so by providing a structured framework for the evaluation of (i) whether the land use constraints in a particular area of land or parcel render that particular area of land or parcel acceptable or unacceptable for certain uses; (ii) whether the area of land or parcel is suitable for acquisition and development/preservation purposes; and (iii) how much of the area of land or parcel can actually be developed/preserved and whether it makes environmental or economic sense to do so.

The structured framework comprises at least one Geographic Information System (GIS) with access to at least one private and at least one public data base of various physical, geographic, geologic, edaphic and flora parameters; and software providing structured analysis of said parameters for land use evaluation. Access to the structured framework is provided to individuals who are experienced in and will be conducting the evaluation. Such individuals include but are not limited to civil engineers, planners, surveyors and any other individual having experience in engineering technology (hereinafter "engineers").

After the engineers set the parameters for the evaluation, the software might interact with either the GIS, and/or the databases, and the engineers, for the purpose of retrieving, analyzing the appropriate data and producing a map and a report that will allow LUPs to readily see how much of the parcel of land is actually developable, and whether it makes any economic sense to do so. By automating the framework around the GIS, the databases, and the engineers, the evaluation process is virtually guaranteed to include all of the information critical thereto. Further, by automating the framework, access and training can be provided to inexperienced engineers for the purpose of training them and helping them conduct the analysis being performed, in a consistent, precise, objective and reproducible fashion.

A block diagram of an environment suitable for practicing the illustrative embodiment fo the present invention is generally depicted as 10 in FIG. 1. The environment includes an engineer 20 communicating with a computer with a display 30. The computer with the display 30 in turn, is connected to multiple public data bases 40 and private data bases 50, and an electronic device 60, via a network 90. In addition, the computer with the display 30 is connected to a printing device 32.

The electronic device 60 includes at least one storage location for at least one privately gathered and created map data base 62 (hereinafter the "privately gathered data base 62") comprising at least one file 62A relating to at least one geographic area, i.e. an area relating to a town, county, state or geographic location. The at least one file 62A, in turn, comprises privately gathered information, including but not limited to physical, geographic, geologic, edaphic and flora parameters and maps present in and relating to that geographic area, all merged to form said single file 62A. The privately gathered database 62 may be any one of a number of different types of databases. In one embodiment the privately gathered database 62 is a Linux data base. Those skilled in the art will recognize that the privately gathered database 62 may alternately be located remotely from the electronic device 60. Furthermore, those skilled in the art will recognize that, over time and use, the privately gathered data base 62 will grow to comprise multiple files 62A, each file corresponding to a different geographic areas respectively, together with the geographic areas' corresponding physical, geographic, geologic, edaphic and flora parameters.

The electronic device 60 also includes at least one storage location for LUP confidential information data base 64 (hereinafter the "LUP data base 64") for privately gathered information relating to LUPs. Such information includes but is not limited to the name of the LUPs, the name of their company, address, telephone number, nature of their business, contact information etc. Furthermore, the electronic device 60 includes at least one storage location for at least one work-in-progress data base 68 comprising at least one temporary working file 68A.

The electronic device 60 further comprises a Geographic Information System (hereinafter the "GIS") 70 and a Software Decision Control Framework 80. The Software Decision Control Framework 80 interacts with the GIS 70 to control the flow of information to the requesting engineer 20 via a network 90 interfaced with the electronic device 60. The network 90 may be a local area network (LAN), a wide area network (WAN), an intranet, the Internet, a wireless network, a satellite network, or any other type of network that can function like the foregoing networks. Also interfaced with the network 90 are multiple storage locations for public databases 40 and private databases 50 holding data relevant to physical, geographic, geologic, edaphic and flora parameters present in and relating to various geographic areas worldwide. The private third party databases 50 may be available to the public on a subscription basis or via some other limited access manner.

In order for the Software Decision Control Framework 80 to control the flow of information to the requesting engineer 20 via a network 90 interfaced with the electronic device 60, the network 90 must also be interfaced with the computer with a display 30 and the engineer 20. Those skilled in the art will recognize that other types of electronic devices capable of accessing the network 90, such as cell phones, PDAs, wireless PCs, may be substituted for the computer with display 30 without departing from the scope of the present invention.

The LUP, as defined herein above, who is interested in evaluating and determining whether a particular parcel or area of land is suitable for acquisition and development or acquisition and preservation, whether said parcel of land has land use constraints that render it acceptable or unacceptable for certain uses, how much of said parcel of land can actually be developed or preserved, and whether it makes environmental or economic sense to do so, will address his or her inquiries regarding same to an engineer 20. In response to said inquiries, the engineer 20 will access the electronic device 60 via the network 90 using the computer with the display 30. The Software Decision Control Framework 80 will interact with the engineer 20, the GIS 70 and/or the privately gathered base 62, and on the basis of the information provided to it by the engineer 20, will present a single consolidated map and evaluation report having a single viability factor and a soils' grade, which together will: a) provide a thorough mapping of said particular parcel of land area; b) identify and quantify the fractions of the land area that exhibit land use constraints; c) identify and quantify those fractions of the land area that are actually free of land use constraints, and d) establish the area of optimum use thereof in conformance to local, federal and state land use regulations and non-governmental land use policies; all before the LUP incurs significant cost and expense in connection with said particular parcel or area of land, and even before conducting a walk-through. Or, if the walk-through has in fact taken place, the evaluation report will confirm or negate the LUPs' findings during the walk-through. In either case, the factor and the evaluation report will enable the LUPS to develop an understanding of the scope of land use constraints right from the very beginning thereby providing the LUPS with a unique decision making advantage.

Figure 2A:
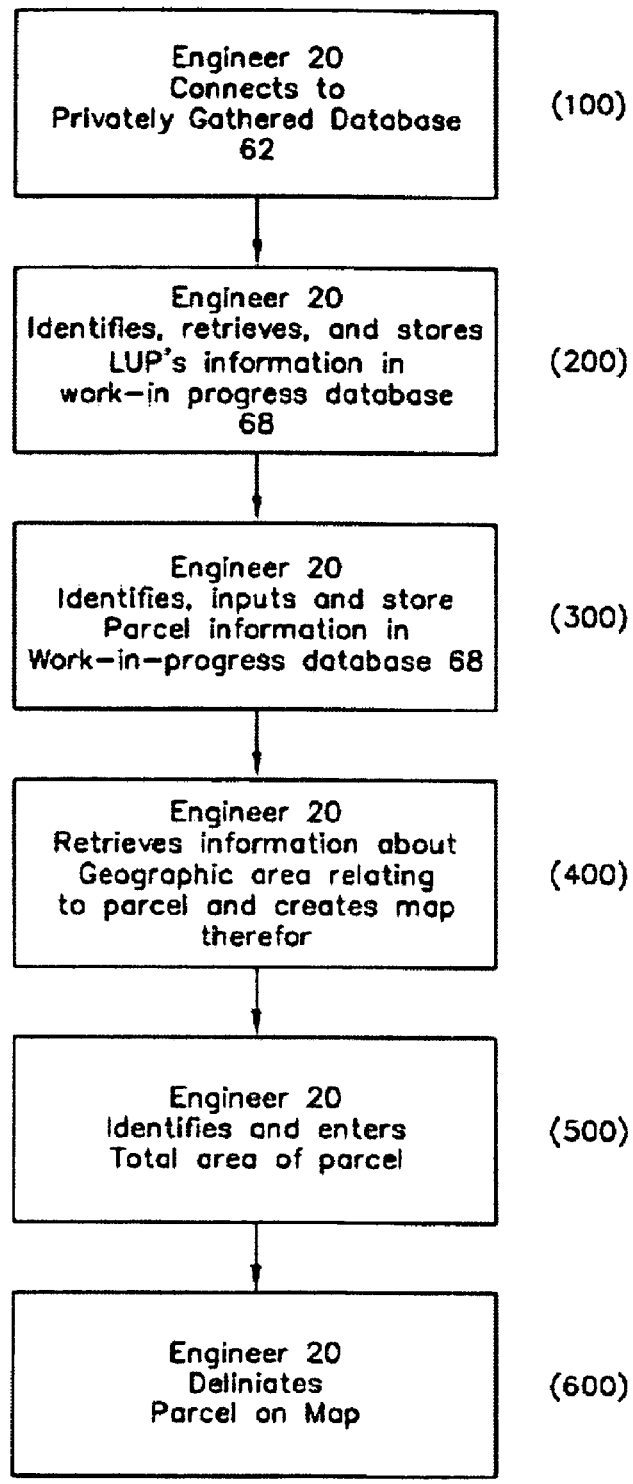
FIG. 2 is a flow chart of the sequence of steps followed by an engineer when using the illustrative embodiment of the present invention to produce an evaluation report in connection with a particular parcel or area of land.
Figure 2:
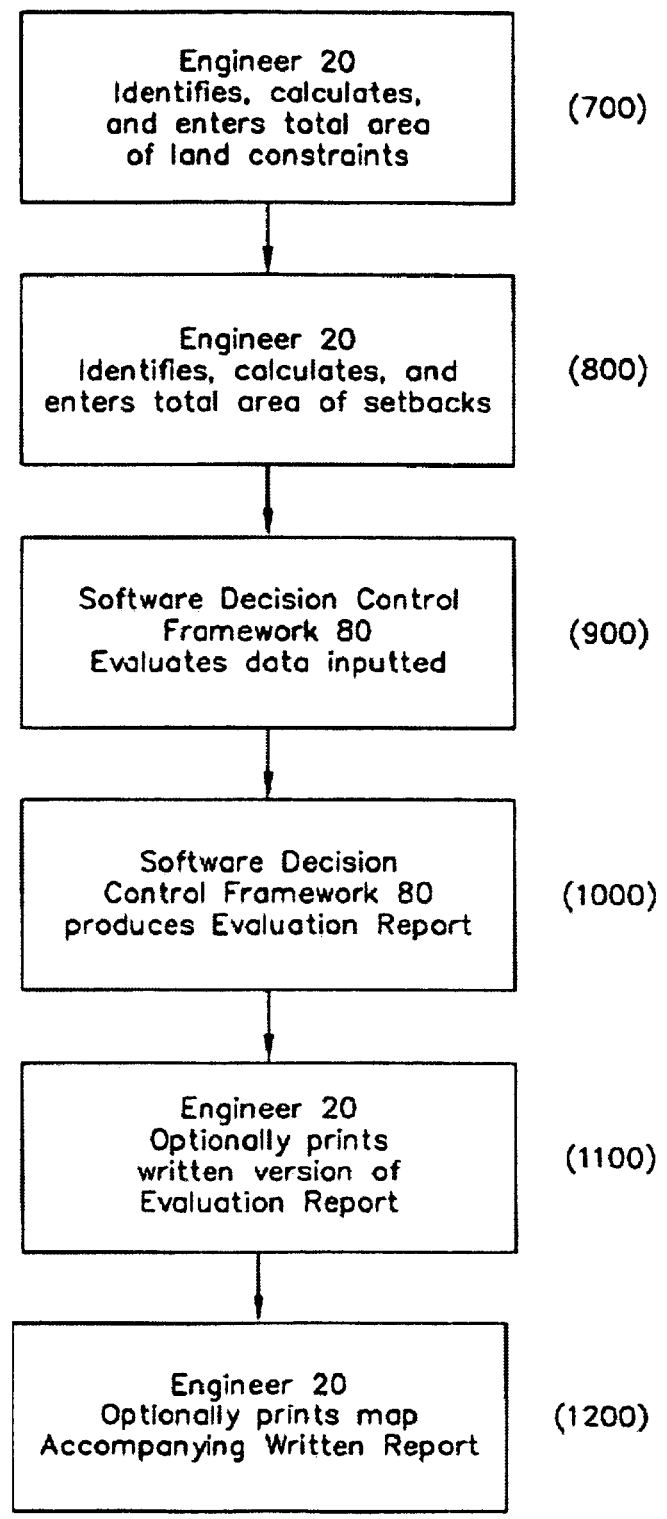

FIG. 2 is a flow chart of the sequence of steps followed by an engineer using the illustrative embodiment of the present invention to generate an evaluation report, in connection with a particular parcel or area of land (hereinafter the "parcel"). The sequence begins when the engineers 20 use their computer with a display 30 to connect to the privately gathered information database 62 over the network 90.

Once connected, and using the Software Decision Control Framework 80, the engineers 20 identify, retrieve the LUP's information from the LUPS Confidential Information data base 64 and temporarily store the LUP's information in the temporary file 68A in the work-in-progress data base 68. The engineers 20 can search the LUPS Confidential Information data base 68 using the LUP's company name, first name, last name or telephone number. If the engineers 20 cannot find the LUP's information on the LUPS Confidential Information data base 68, the engineers can input the new LUPS information into the LUPS Confidential Information data base 68, using the Software Decision Control Framework 80. Thereafter, the engineers 20 can import and temporarily store the new LUPS information in the temporary file 68A, in the work-in-progress data base 68.

Following the storage of the LUP's information in the temporary file 68A, the engineers 20 identify, input and temporarily store all information relating to the proper identification of the particular parcel, by attaching it to the file path of the temporary file 68A where the LUP's information has been previously stored, in the work-in-progress data base 68. Such information will include a name for the parcel, so that it can be easily recognized on the evaluation report; the township, county, and state within which the parcel is located; and the Section/Block/Lot of the particular parcel, so that there is no question about the parcel or area of land being evaluated.

After all of the identification parameters for both the LUPS and the particular parcel of land area have been stored in a temporary file 68A in the work-in-progress data base 68, the Software Decision Control Framework 80 will interact with the engineers 20 to retrieve from the privately gathered information data base 62, the at least one file 62A comprising the privately gathered information, including but not limited to physical, geographic, geologic, edaphic and flora parameters and maps present in and relating to that geographic area corresponding to the parcel stored in the temporary file 68A, and attach it to the file path thereof. If a file for the geographic area corresponding to the parcel does not exist, then the Software Decision Control Framework 80 will interact with the GIS 70 to retrieve via the network 90 from the at least one public data base 40 and the at least one private data base 50 information about the geographic area relating to the parcel, including but not limited to, photographic and aerial maps, topographic maps, wetlands maps, and soils and flood plain maps. Once the information is retrieved it is merged and matched to scale to create, among other things a map of the geographic area relating to the parcel, and stored in the privately gathered database 62, in a file 62B where it becomes available for retrieval not only in connection with the parcel but for other corresponding parcels as well. The file 62B is then retrieved and attached to the file path of the temporary file 68A created in connection with the LUPS and the parcel of interest.

Thereafter, the Software Decision Control Framework 80 interacts with the engineers 20 to (i) identify and enter the total area of the parcel in acres; (ii) interact with the GIS to create and optionally print a map of the parcel having all of its physical, geographic, geologic, edaphic and flora parameters depicted thereon, through the identification and retrieval of precise position data that correlates and aligns the legal description map for the parcel with that portion of the map of the geographic area relating to the parcel, which has been retrieved and attached to the file path of the temporary file 68A for the LUPS and the parcel of interest; (iii) identify, calculate and enter the total area of the land constraints in acres, by marking, via the GIS 70, on the map created in step (ii) all of the land constraints in the parcel through the identification and retrieval of precise position data that correlates and aligns the description of the land constraints, as seen by the engineer on the parcel of land and shown in the map of step (ii) herein above. Such land constraints include but are not limited to the steep slopes present on the land, riparian zones, suspected riparian zones, watercourses such as rivers and streams, estuaries, utilities, aquifers, soil types and flood zones, and soil grade calculations; and (iv) identify, calculate and enter the total area of the setbacks of said land constraints in acres, by further marking, via the GIS 70, on the map created in step (ii), through the identification and retrieval of precise position data that correlates and aligns the description of, the setbacks from said land constraints, as mandated by law and by local regulations and calculated by the engineer on the basis of his knowledge and interpretation of the physical, geographic, geologic, edaphic and flora parameters found on the parcel of land and shown in the map of step (ii) herein above The Software Decision Control Framework 80 will then analyze all of this information to determine how much of the area of the parcel can actually be developed or preserved.

The analysis conducted by the Software Decision Control Framework 80 uses the information inputted by the engineers 20 to calculate the total constrained area and the total unconstrained area of the parcel as a whole. It does so by taking the total acreage of the parcel in question and deducting therefrom the acreage area of each of the land constraints set forth above together with the acreage areas of each of the setbacks for each of such land constraints, respectively. It then deducts an additional 20% from the total unconstrained area as an estimated amount of space for road and utility construction to produce:(a) the total estimated developable area for the parcel in question; and (b) the final soil grade for the parcel of land area which is calculated using the developable area of the parcel in % value. Once it completes this analysis, it produces an evaluation report. The evaluation report can be printed and/or stored in the privately gathered database 62 for future use or reference.

Figure 3:
FIG. 3 is one example of a consolidated map generated by the illustrative embodiment of the present invention.
Figure 5A:
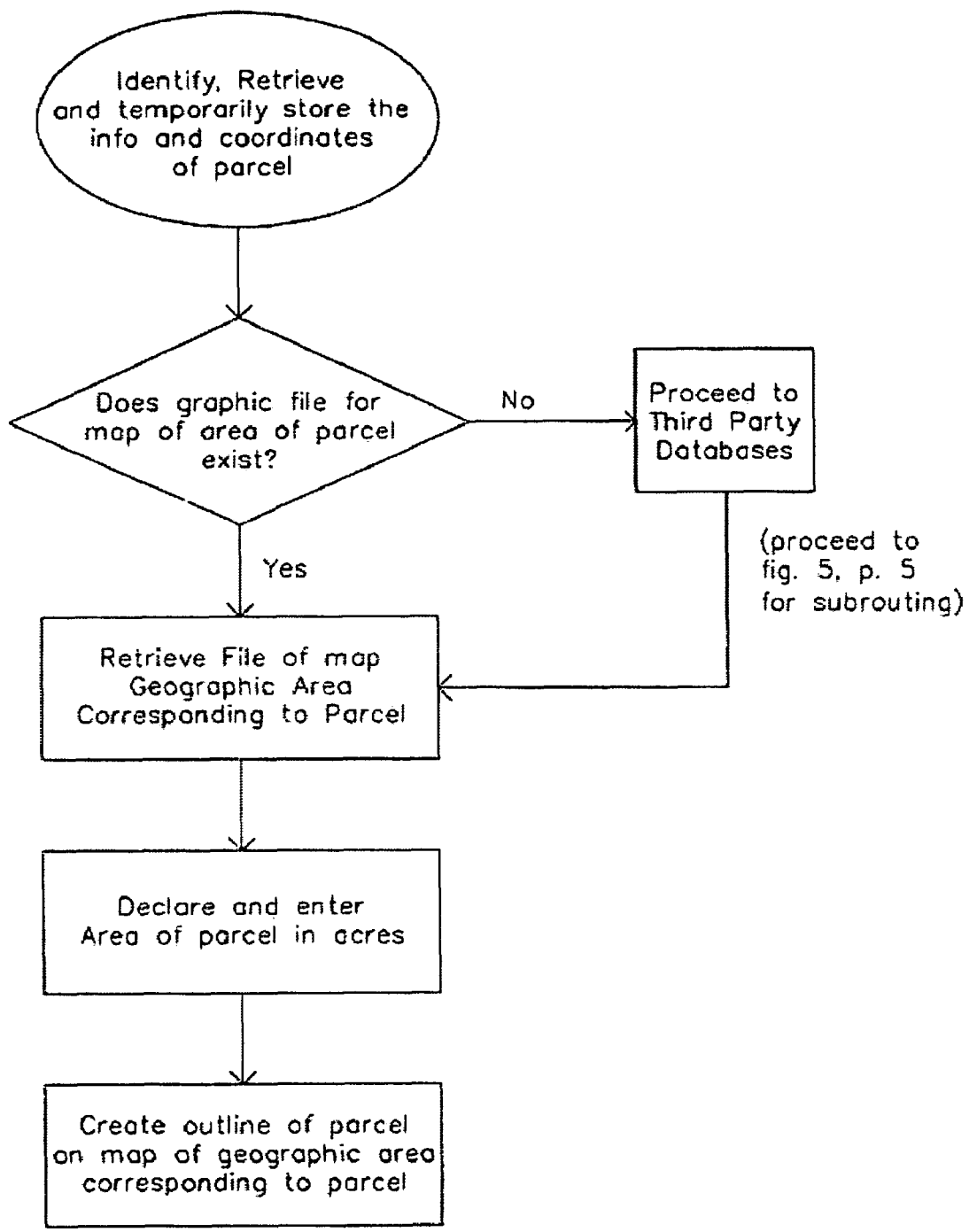
FIG. 5 is a flowchart of a sequence of steps followed by the illustrative embodiment of the present invention for the input of all the information relevant and material to the evaluation report.
Figure 5B:
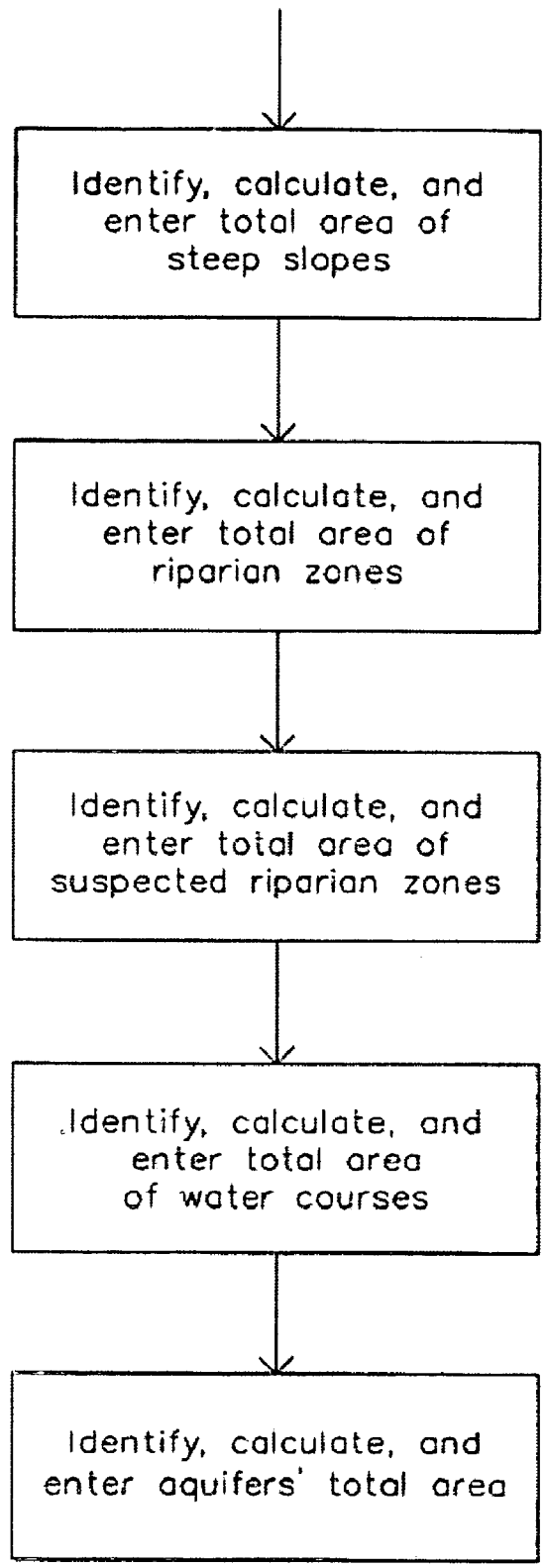
Figure 5C:
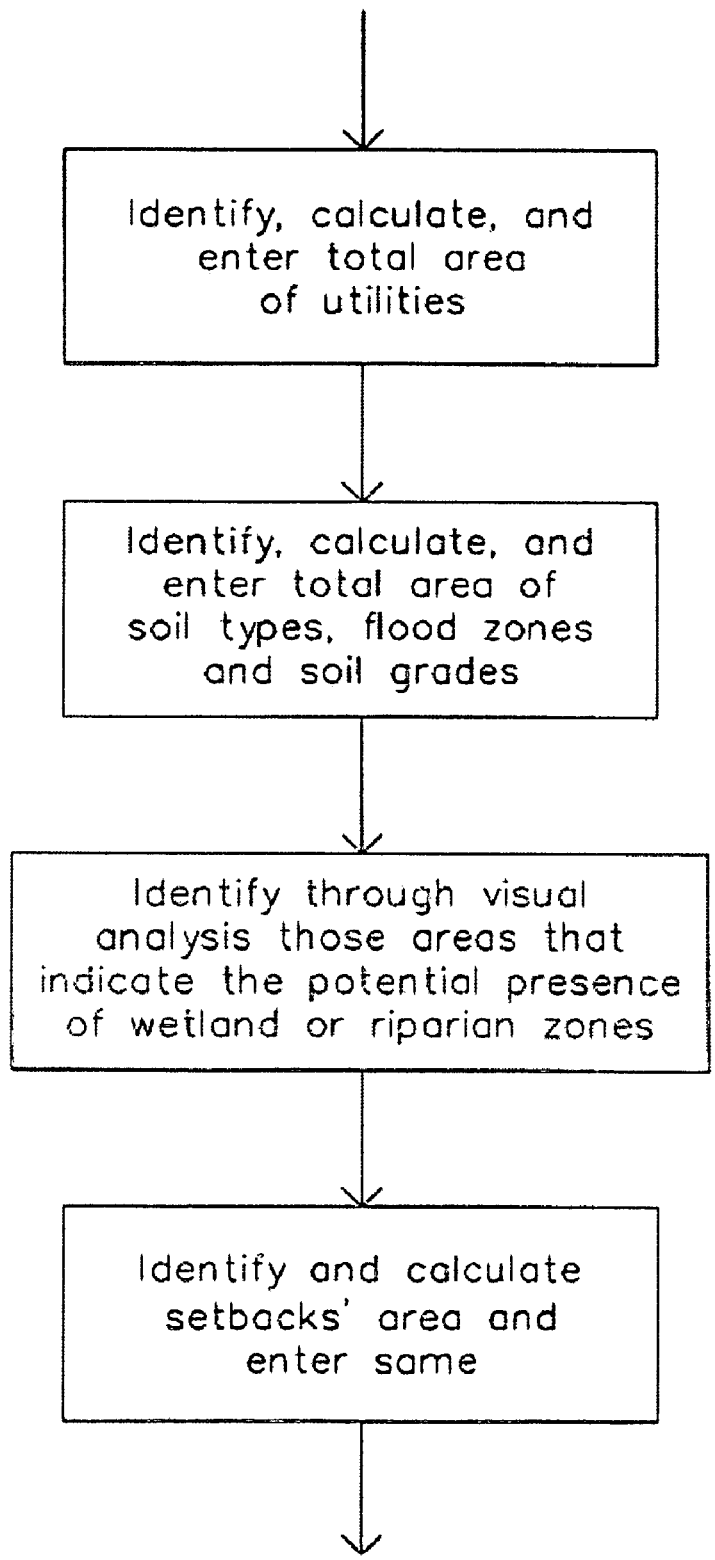
Figure 5D:
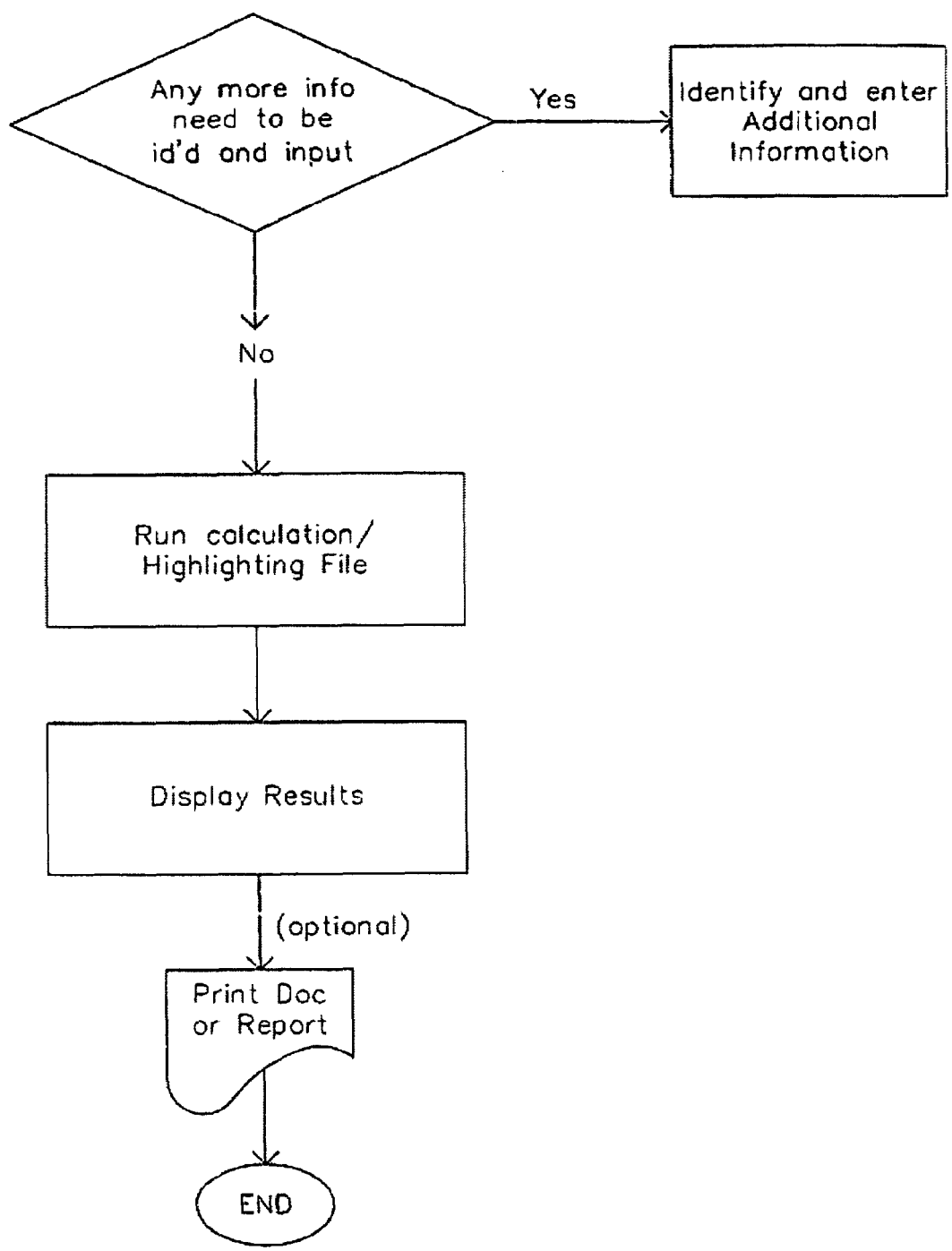
Figure 5E:
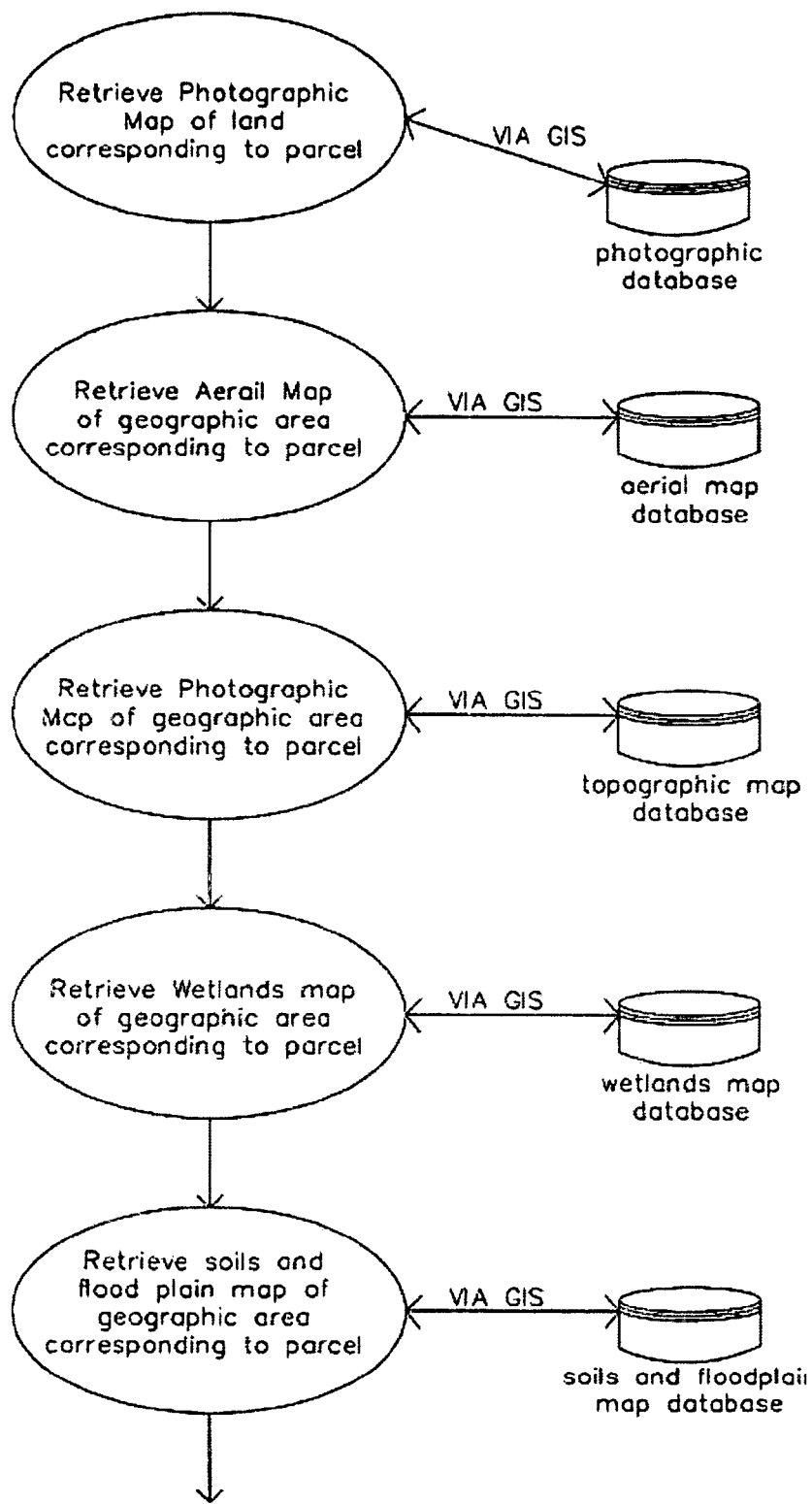
Figure 5F:
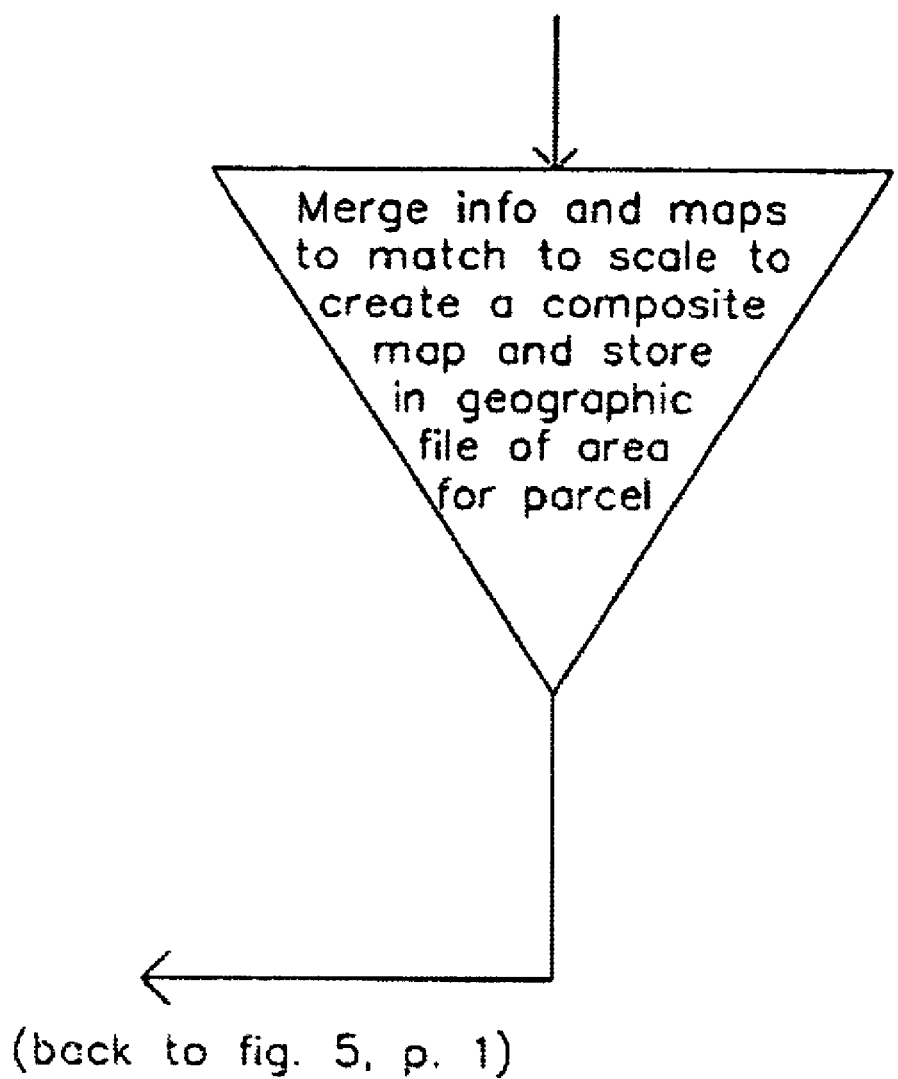

The evaluation report comprises a written report and a consolidated map as a visual accompaniment to the written report for the purpose of verifying and identifying the information contained in the written report. FIG. 3 depicts the consolidated map generated by the illustrative embodiment of the present invention and FIG. 4 depicts the written report. Alternatively, the consolidate map and report could be present as one single document The consolidated map includes the boundaries of the parcel or area of land in question, together with all of both the compiled constrained and non-constrained areas of the parcel or area. It is a visual and graphic representation of the written report. The constrained areas shown will include, but are not limited to steep slopes present on the land, riparian zones, suspected riparian zones, watercourses such as rivers and streams, utilities, aquifers, soil types and flood zones, soil grade calculations and all of the setbacks thereof.

The written report in turn contains the LUPS information and the parcel identification information. It sets forth and identifies the individual land constraints; the area, in acres, of each land constraint; and the % deduction from the total area of the parcel of land, that each land constraint, and the setbacks associated therewith, represents. More importantly, however, the evaluation report sets forth the percentage of the total estimated developable area, i.e., percentage of the total area (size), of the parcel in question, via a final calculated soil grade and a viability index for the parcel in question.

The final calculated soil grade is displayed on a scale of A to D. It is based on the Soil Conservation Service (hereinafter "SCS")'s soil descriptions in connection with septic applications, such descriptions including but not limited to "slight", i.e., only slightly limited for septic applications, "moderate", i.e., only moderately limited for septic applications, and "severe", i.e., severely limited for septic applications. In one embodiment of the invention, a soil grade of "A" means that 70% or more of the parcel carries the desired SCS classification of "slight;" a soil grade of "B" means that 60-70% of the parcel carries the SCS classification of "slight", the balance of the parcel carrying a mixture of the other SCS soil classifications; a soil grade of "C" means that 50-60% of the parcel carries the SCS classification of "slight", the balance carrying a mixture of the other classifications; and, a soil grade of "D" means less than 50% of the parcel carries slight restriction, while the balance carries a mixture of the other classifications; the worse grade a parcel can have. Those skilled in the art will recognize that these percentages can change depending on the application.

In turn, the viability index of the parcel or area of land in question is presented in roman numeral form on a scale of I to IV. A viability index of I means that 70% or more of the parcel is developable. A viability index of II means that 60-70% of the parcel is developable. A viability index of III means that only 50-60% of the parcel is developable and a viability index of IV means that less than 50% of the parcel is actually developable. Those skilled in the art will recognize that these percentages can also change depending on the application.

The sequence of steps depicted in FIG. 5 shows how the Software Decision Control Framework 80 interacts with the engineers to prompt them and to insure that all of the information relevant and material to the analysis is inputted. The process comprises the steps of prompting the engineers to:

(a) identify, retrieve and temporarily store all of the coordinates of the parcel of interest in temporary file 68A;

(b) retrieve the file of the geographic area corresponding to the parcel from the privately gathered information data base 62. If no such file exists, interact with the GIS 70 and retrieve via the network 90 from the multiple public 40 and private data bases 50 information about the geographic area relating to the parcel, including but not limited to, photographic and aerial maps, topographic maps, wetlands maps, and soils and flood plain maps. Merge and match the information retrieved to scale to create and store in the privately gathered data base 62, among other things a map of the geographic area relating to the parcel, and thereafter attach it to the temporary file 68A;

(c) declare the number of acres contained within the parcel or area of land of interest;

(d) create a map of the parcel having all of the physical, geographic, geologic, edaphic and flora parameters depicted thereon, through the identification and retrieval of precise position data that correlates and aligns the legal description map for the parcel with a portion of the map of the geographic area relating to the parcel of interest;

(e) study the map of the parcel or area of land;

(f) identify, calculate and enter the total area of the steep slopes in acres, by marking, via the GIS 70, on the map the steep slopes in the parcel through the identification and retrieval of precise position data that correlates and aligns the description of the steep slopes on the parcel map, as seen by the engineer;

(g) identify, calculate and enter the total area of the riparian zones in acres, by marking, via the GIS 70, on the map the riparian zones in the parcel through the identification and retrieval of precise position data that correlates and aligns the description of the riparian zones, as seen by the engineer;

(h) identify, calculate and enter the total area of the suspected riparian zones in acres, by marking, via the GIS 70, on the map the suspected riparian zones in the parcel through the identification and retrieval of precise position data that correlates and aligns the description of the suspected riparian zones on the map, as seen by the engineer;

(I) identify, calculate and enter the total area of the water courses, e.g. rivers, streams, lakes, in acres, by marking, via the GIS 70, on the map the water courses in the parcel through the identification and retrieval of precise position data that correlates and aligns the description of the watercourses on the map, as observed by the engineer;

(j) identify, calculate and enter the total area of the aquifers in acres, by marking, via the GIS 70, on the map the aquifers in the parcel through the identification and retrieval of precise position data that correlates and aligns the description of the aquifers on the parcel map, as seen by the engineer;

(k) identify, calculate and enter the total area of the utilities in acres, by marking, via the GIS 70, on the map the utilities in the parcel through the identification and retrieval of precise position data that correlates and aligns the description of the utilities on the map, as seen by the engineer;

(l) identify, calculate and enter the total area of the soil types, flood zones, and soil grades, in acres, by marking, via the GIS 70, on the map the soil types, flood zones, and soil grades in the parcel through the identification and retrieval of precise position data that correlates and aligns the description of the soil types, flood zones, and soil grades, as seen by the engineer and based on his experience;

(m) identify, calculate and enter the total area of the setbacks for each and every land constraint identified in (f)-(m) herein above, in acres, by marking, via the GIS 70, on the map the setbacks for each and every land constraint identified in (f)-(m) herein above, through the identification and retrieval of precise position data that correlates and aligns the description of the setbacks for each and every land constraint identified in (f)-(m) herein above, as seen by the engineer and calculated on the basis of local codes and regulation; and (n) add any other information that the engineers might believe relevant and material to the analysis and determination of what area of the parcel can actually be developed or needs to be preserved. Those skilled in the art will recognize that entering of additional constraints may be accomplished during the evaluation process without departing from the scope of the invention.

The Software Decision Control System further comprises a visual training system or visual tutorial 100 (hereinafter the "training system 100") which interacts with and teaches the engineers, including but not limited those engineers who have never used the invention before, how to correctly and reproducibly perform certain overall functions, that are necessary components of the invention, e.g., downloading map files from various sources and storing them in the privately gathered data base 62, or entering the area of the land constraints. It provides step by step instructions to guide the engineers being trained to understand what is needed to accomplish the analysis accurately, precisely and reproducibly.

With the visual training system 100, training of engineers can be done in a cost effective manner. More importantly, however, it insures that the engineers have all of the tools and skills that will allow them to properly interact with the Software Decision Control Framework 80, the GIS 70 and the privately gathered data base 62, to produce accurate and precise evaluation reports that have included all possible constraints without sacrificing any time, thereby providing the LUPS with a significant advantage.

The sequence of screens depicted in FIG. 6 shows how the Training System 100 interacts with the engineers to train them in retrieving storing, and merging of all of the information relating to a geographical area relating to a parcel of interest and to create a map and file therefor; and properly identifying and superimposing the parcel's map on the map of its corresponding geographical area, as well as the parcel's constraints and setbacks therefor for the purpose of calculating and entering the information necessary for the analysis of data and production of evaluation report. The training system interacts with and trains the engineers to:

(i) create a directory structure, via the GIS 70, that will make downloaded map files, relating to a particular geographical area, easy to locate and retrieve. FIG. 7 depicts the set up of a file tree that will allow the easy retrieval of these files.

(ii) download the topography of the particular geographical area by prompting them to interact with the GIS 70, the public and private data bases 40 and 50, via the network 90 and the computer with the screen 30, find the appropriate interactive map, select the geographical quadrangle on the map which contains the engineers' targeted parcel making sure that the quadrangle's name is noted, as that is the name that will be used when downloading the aerial photos and other pertinent data bases, preview the selected quadrangle to determine if it is the correct file, i.e. the file that actually contains the target parcel, and download the quadrangle in the topography folder created during the file tree setup;

(iii) download aerial photos by prompting them to interact with the GIS 70, the public and private data bases 40 and 50, via the network 90, and the computer with the screen 30 to locate the appropriate orthoimagery application, direct download it by selecting the county, the city and town in which the target property is in, how to find the orthoimagery application if the engineers cannot find it in the first instance, and save the aerial photos by downloading them into the aerial photos folder created during the file tree setup;

(iv) start and create a new map for the geographical area relating to the parcel, by interacting with the Software Decision Control System to create a file for the repository of the new map, enter all the coordinates for the geographical area relating to the parcel of interest into the file, retrieve and add to the file, the aerial photos and the topography earlier stored using the file tree for quick retrieval, and merge all of the foregoing to match to scale and (v) create and store a file for the geographic area in the privately gathered data base for future or immediate use therefor.

(vi) import the file of the geographic area and attach it to the temporary file in the work in progress data base 68;

(vii) enter coordinates on the image of the file, save and properly identify each of the constraints to be entered;

(viii) draw the property lines of the parcel by centering on the subject property on the geographical area imported, comparing the tax map of the subject property with the geographical area merged map of aerial photos and topography to make sure that the right property has been centered, determining a good starting point, such as an easily identifiable corner of the parcel, recording the coordinates of the point, finding the next turn point and recording the coordinates of same until all of the coordinates of the property have been identified and recorded and drawing of the property lines;

(ix) identify and draw the streams/rivers and suspected wetlands constraints within the perimeter of the property either by enhancing those that are already a part of the map as a result of the aerial photographs and topography information imported via the GIS, or if streams/rivers and suspected wetlands are not shown on the plan, but are visible from the aerial photography, drawing them in by using the same method as when drawing the property lines;

(x) add the setbacks by offsetting the entered stream and suspected wetland perimeters by 100 feet or what is actually specified by local code, and establishing the areas thereof by drawing them in and using the same method as when drawing the property lines;

(xi) add the steep slopes and establish the areas thereof, by drawing them in and using the same method as when drawing the property lines; and (xi) add the soil types by selecting constant points from soil maps and aerial photos obtained via GIS, scaling the distances from the constant points to the soil type boundary lines to obtain numerous points around the boundaries (all corners, abnormalities, etc), connecting all points around the specified boundaries, drawing the boundaries using the constant points and scaled dimensions, inserting drawn boundaries into the map and labeling accordingly.

It will thus be seen that the invention attains the objectives stated in the previous description. Since certain changes may be made without departing from the scope of the present invention, it is intended that all matter contained in the above description, or shown in the accompanying drawings be interpreted as illustrative and not in a literal sense. Practitioners of the art will realize that the sequence of steps depicted in the figures can be altered without departing from the scope of the present invention and that the illustrations contained herein are singular examples of a multitude of possible depictions of the present invention.

We claim

1. A system for the determination of the percentage of area of a parcel of land available for development or preservation comprising:

at least one privately gathered data base comprising at least one file relating to at least one geographic area and its privately gathered corresponding map, physical, geographic, geologic, edaphic, and flora parameters present in and relating to said geographic area;

a Software Decision Control Framework connected to said privately gathered data base;

a Geographic Information System connected to and interacting with both said Software Decision Control Framework and said privately gathered data base;

a network connected and interfaced to said Software Decision Control Framework; and at least one data base interfaced with said network, said data base comprising physical, geographic, geologic, edaphic and flora parameters present in and relating to various geographic areas worldwide, whereby said Software Decision Control Framework interacts with said privately gathered data base, said Geographic Information System, said network and said database to present an evaluation report which identifies, quantifies and establishes the percentage of area of the parcel of land for development and preservation in conformance to local, federal and state land use regulations and non-governmental land use policies.

2. The system according to claim 1, wherein said privately gathered database may be a LINUX® based data base.

3. The system according to claim 1, wherein said privately gathered database may be a MICROSOFT® based data base.

4. The system according to claim 1, wherein said privately gathered database further comprises multiple files, each file respectively corresponding to a different geographic area and its corresponding maps, physical, geographic, geologic, edaphic and flora parameters.

5. The system according to claim 1 further comprising at least one storage location for a Land Use Professional confidential information data base and at least one storage location for at least one work-in-progress data base, comprising at least one temporary working file.

6. The system according to claim 1, wherein said network is selected from a group of networks consisting of a local area network (LAN), a wide area network (WAN), an intranet, the Internet, a wireless network, and a satellite network.

7. The system according to claim 1, wherein said the network is also be interfaced to a computer with a display and an engineer.

8. The system according to claim 7, further comprising a Training System to interact with and train the engineer in retrieving storing, and merging all of the information relating to proper use of said system.

9. A method using a system for the determination of the percentage of area of a parcel of land available for development or preservation comprising at least one privately gathered data base comprising at least one file relating to at least one geographic area and its privately gathered corresponding map, physical, geographic, geologic, edaphic, and flora parameters present in and relating to said geographic area, a Software Decision Control Framework connected to said privately gathered data base, a Geographic Information System connected to and interacting with both said Software Decision Control Framework and said privately gathered data base a network connected and interfaced to said Software Decision Control Framework and at least one data base interfaced with said network, said data base comprising physical, geographic, geologic, edaphic and flora parameters present in and relating to various geographic areas worldwide for the determination of the percentage of area of a parcel of land available for development or preservation, comprising the steps of:

communicating with the privately gathered information data base having a least one geographic area file comprising privately gathered maps and physical, geographic, geologic, edaphic and flora parameters present in and relating to said geographic area, the Geographic Information System, and the at least one third party data base, via the network and the software decision control framework, and retrieving information comprising photographic and aerial maps, topographic maps, wetlands maps, and soils and flood plain maps corresponding to the geographic area for said parcel of land;

merging said information, matching it to scale, and creating a single map of a geographic area corresponding to the parcel of land, via the Geographic Information System and Software Decision Control Framework and storing said single map on said privately gathered database;

identifying the total area of the parcel of land in acres using said Software Decision Control Framework;

interacting with said GIS and said Software Control Framework to outline the parcel of land with said single map of said geographic area corresponding to the parcel of land having all of the physical, geographic, geologic, edaphic and flora parameters of the parcel depicted thereon;

identifying all of the parcel's land constraints and respectively calculating the area in acres of each of the parcel's land constraints and the setbacks thereof, via said GIS and Software Control Framework, by marking them on said outline of the parcel of land on said singe map of said geographic area corresponding to the parcel of land having all of the physical, geographic, geologic, edaphic and flora parameters of the parcel depicted thereon;

analyzing the area in acres of each of the parcel's land constraints and their respective setbacks, as compared to the total area of the parcel of land, via said Software Control Framework to determine the percentage of the area of the parcel of land actually developable or preservable, and producing a simple evaluation report comprising the total estimated developable area and the final soil grade for the parcel of land.

10. The method according to claim 9, wherein the evaluation report comprises a written report and a consolidated map.

11. The method according to claim 10, wherein said consolidated map comprises the outline of the area of the parcel of land, together with an outline of all of said constrained and non-constrained areas of the parcel, said constrained areas comprising the areas of steep slopes present on the parcel of land, riparian zones, suspected riparian zones, watercourses, utilities, aquifers, soil types and flood zones, soil grade calculations and all of the setbacks thereof.

12. The method according to claim 10, wherein said written report comprises said individual land constraints; the area, in acres, of each land constraint; the percent deduction from said total area of the parcel of land, that each and constraint, and the setbacks associated therewith, represents, and the percentage of the total estimated developable or preservable area of the parcel.

13. A method utilizing a system for the determination of the percentage of area of a parcel of land available for development or preservation comprising at least one privately gathered data base comprising at least one file relating to at least one geographic area and its privately gathered corresponding map, physical, geographic, geologic, edaphic, and flora parameters present in and relating to said geographic area, a Software Decision Control Framework connected to said privately gathered data base, a Geographic Information System connected to and interacting with both said Software Decision Control Framework and said privately gathered data base a network connected and interfaced to said Software Decision Control Framework at least one third party data base interfaced with said network, said data base comprising physical, geographic, geologic, edaphic and flora parameters present in and relating to various geographic areas worldwide for the determination of the percentage of area of a parcel of land available for development or preservation, and an engineer comprising the steps of:

identifying the coordinates of the parcel of land;

communicating with the privately gathered information data base having a least one geographic area file comprising privately gathered maps and physical, geographic, geologic, edaphic and flora parameters present in and relating to said geographic area, the Geographic Information System, and the at least one third party data base, via the network and the software decision control framework, and retrieving information comprising photographic and aerial maps, topographic maps, wetlands maps, and soils and flood plain maps corresponding to the geographic area for said parcel of land;

merging said information, matching it to scale, and creating a single map of a geographic area corresponding to the parcel of land, via the Geographic Information System and Software Decision Control Framework and storing said single map on said privately gathered database;

declaring the number of acres contained within the area of the parcel of land;

creating an outline of the perimeter of the parcel of land on said single map having all of the physical, geographic, geologic, edaphic and flora parameters depicted thereon studying said outlined parcel of land and determining the presence of steep slopes, riparian zones, suspected riparian zones, water courses, aquifers, utilities, soil types, flood zones, and soil grades within the perimeter of the parcel of land;

identifying, calculating and entering the total area of the steep slopes in acres, by marking said outlined parcel of land on said single map, via the GIS and the Software Decision Control Framework, the steep slopes in the parcel through the identification and retrieval of precise position data that correlates and aligns the description of the steep slopes within said outlined parcel of land on said single map;

identifying, calculating and entering the total area of the riparian zones in acres, by marking said outlined parcel of land on said single map, via the GIS and the Software Decision Control Framework, the riparian zones in the parcel through the identification and retrieval of precise position data that correlates and aligns the description of the riparian zones within said outlined parcel of land on said single map;

identifying, calculating and entering the total area of the suspected riparian zones in acres, by marking said outlined parcel of land on said single map, via the GIS and the Software Decision Control Framework, the suspected riparian zones in the parcel through the identification and retrieval of precise position data that correlates and aligns the description of the suspected riparian zones within said outlined parcel of land on said singe map;

identifying, calculating and entering the total area of the water courses in acres, by marking said outlined parcel of land on said single map, via the GIS and the Software Decision Control Framework, with the watercourses in the parcel through the identification and retrieval of precise position data that correlates and aligns the description of the watercourses within said outlined parcel of land on said single map;

identifying, calculating and entering the total area of the aquifers in acres, by marking said outlined parcel of land on said single map, via the GIS and the Software Decision Control Framework, with the aquifers in the parcel through the identification and retrieval of precise position data that correlates and aligns the description of the aquifers within said outlined parcel of land on said single map;

identifying, calculating and entering the total area of the utilities in acres, by marking said outlined parcel of land on said single map, via the GIS and the Software Decision Control Framework, with the utilities in the parcel through the identification and retrieval of precise position data that correlates and aligns the description of the utilities within said outlined parcel of land on said single map;

identifying, calculating and entering the total area of the soil types, food zones, and soil grades in acres, by marking said outlined parcel of land on said single map, via the GIS and the Software Decision Control Framework, with the soil types, flood zones, and soil grades in the parcel through the identification and retrieval of precise position data that correlates and aligns the description of the soil types, flood zones, and soil grades within said outlined parcel of land on said single map;

identifying, calculating and entering the total area of the setbacks for each and every land constraint identified herein above, in acres, by marking said outlined parcel of land on said single map, via the GIS and the Software Decision Control Framework, with the setbacks for each and every land constraint identified herein above in the parcel through the identification and retrieval of precise position data that correlates and aligns the description of the setbacks for each and every and constraint identified herein above within said outlined parcel of land on said single map;

adding any other information that is relevant and material to the analysis and determination of what area of the parcel can actually be developed or needs to be preserved;

analyzing the area in acres of each of the parcel's land constraints and their respective setbacks, as compared to the total area of the parcel of land, via said Software Control Framework to determine the percentage of the area of the parcel of land actually developable or preservable, and producing a simple evaluation report comprising the total estimated developable area and the final soil grade for the parcel of land.

14. In a system for the determination of the percentage of area of a parcel of land available for development or preservation comprising at least one privately gathered data base comprising at least one file relating to at least one geographic area and its privately gathered corresponding map, physical, geographic, geologic, edaphic, and flora parameters present in and relating to said geographic area, a Software Decision Control Framework connected to said privately gathered data base, a Geographic Information System connected to and interacting with both said Software Decision Control Framework and said privately gathered data base a network connected and interfaced to said Software Decision Control Framework at least one third party data base interfaced with said network, said data base comprising physical, geographic, geologic, edaphic and flora parameters present in and relating to various geographic areas worldwide for the determination of the percentage of area of a parcel of land available for development or preservation, an engineer interfaced to said network, and a medium holding computer-executable steps for a training method, said training method comprising the steps of:

creating a downloaded map file directory structure, via the GIS for easy location and retrieval of downloaded map files;

downloading the topography of the particular geographical area by interacting with the GIS and the at least one third party data base, via the network;

downloading aerial photos by interacting with the GIS, the third party data base via the network;

developing a new map for the geographical area relating to the parcel, by interacting with the Software Decision Control System and the GIS, by creating a file for the repository of the new map, entering all the coordinates for the geographical area relating to the parcel, retrieving and adding to the file the aerial photos and the topography earlier stored using the file tree for quick retrieval, and merging all of the foregoing to match to scale;

identifying and drawing the property lines of the parcel;

identifying, drawing on the new map and calculating the area of the streams/rivers, suspected wetlands, steep slopes, soil types utilities and all other land constraints and the setbacks therefor within the perimeter of the parcel; and producing a simple evaluation report comprising the total estimated developable area and the final soil grade for the parcel of land.

* * * * *